July 7, 1959 M. J. RELIS 2,894,247

CHARACTER RECOGNITION DEVICE

Filed Dec. 4, 1953 19 Sheets-Sheet 1

INVENTOR.
MATTHEW J. RELIS
BY Charles P. Boberg
ATTORNEY

July 7, 1959 M. J. RELIS 2,894,247

CHARACTER RECOGNITION DEVICE

Filed Dec. 4, 1953 19 Sheets-Sheet 2

INVENTOR.
MATTHEW J. RELIS
BY Charles P. Boberg
ATTORNEY

July 7, 1959 M. J. RELIS 2,894,247
CHARACTER RECOGNITION DEVICE
Filed Dec. 4, 1953 19 Sheets-Sheet 3

INVENTOR.
MATTHEW J. RELIS
BY Charles P. Boberg
ATTORNEY

July 7, 1959 M. J. RELIS 2,894,247

CHARACTER RECOGNITION DEVICE

Filed Dec. 4, 1953 19 Sheets-Sheet 4

INVENTOR.
MATTHEW J. RELIS
BY Charles P. Boberg
ATTORNEY

INVENTOR.
MATTHEW J. RELIS
BY Charles P. Boberg
ATTORNEY

INVENTOR.
MATTHEW J. RELIS
BY
Charles P. Bobery
ATTORNEY

July 7, 1959 M. J. RELIS 2,894,247

CHARACTER RECOGNITION DEVICE

Filed Dec. 4, 1953 19 Sheets-Sheet 7

INVENTOR.
MATTHEW J. RELIS
BY Charles P. Boberg
ATTORNEY

July 7, 1959 M. J. RELIS 2,894,247

CHARACTER RECOGNITION DEVICE

Filed Dec. 4, 1953 19 Sheets-Sheet 8

INVENTOR.
MATTHEW J. RELIS
BY
Charles P. Boberg
ATTORNEY

INVENTOR.
MATTHEW J. RELIS
BY
Charles P. Boberg
ATTORNEY

July 7, 1959 M. J. RELIS 2,894,247

CHARACTER RECOGNITION DEVICE

Filed Dec. 4, 1953 19 Sheets-Sheet 10

INVENTOR.
MATTHEW J. RELIS
BY
Charles P. Boberg
ATTORNEY

July 7, 1959 M. J. RELIS 2,894,247

CHARACTER RECOGNITION DEVICE

Filed Dec. 4, 1953 19 Sheets-Sheet 11

INVENTOR.
MATTHEW J. RELIS
BY
Charles P. Boberg
ATTORNEY

INVENTOR.
MATTHEW J. RELIS
BY
Charles P. Boberg
ATTORNEY

INVENTOR.
MATTHEW J. RELIS
BY Charles P. Boberg
ATTORNEY

July 7, 1959 M. J. RELIS 2,894,247

CHARACTER RECOGNITION DEVICE

Filed Dec. 4, 1953 19 Sheets-Sheet 14

INVENTOR.
MATTHEW J. RELIS
BY Charles P. Boberg
ATTORNEY

July 7, 1959 M. J. RELIS 2,894,247

CHARACTER RECOGNITION DEVICE

Filed Dec. 4, 1953 19 Sheets-Sheet 15

INVENTOR.
MATTHEW J. RELIS
BY Charles P. Boberg
ATTORNEY

INVENTOR.
MATTHEW J. RELIS
BY
Charles P. Boberg
ATTORNEY

INVENTOR.
MATTHEW J. RELIS
BY Charles P. Boberg
ATTORNEY

INVENTOR.
MATTHEW J. RELIS
BY
Charles P. Boberg
ATTORNEY

INVENTOR.
MATTHEW J. RELIS
BY Charles P. Boberg
ATTORNEY

United States Patent Office 2,894,247

Patented July 7, 1959

2,894,247

CHARACTER RECOGNITION DEVICE

Matthew J. Relis, Bayside, N.Y., assignor to Burroughs Corporation, Detroit, Mich., a corporation of Michigan Application December 4, 1953, Serial No. 396,280

23 Claims. (Cl. 340—149)

This invention relates to means for recognizing legible characters in accordance with the patterns of light and dark areas defined by such characters.

Character recognition devices known to the prior art were subject to a number of disadvantages, among which may be mentioned the following:

(1) In many instances the device was of such a nature that it would not function properly unless the character was positioned very accurately within the scanning field. A slight misplacement of the character in any direction would be likely to cause an erroneous identification thereof.

(2) In other instances these prior devices were unable to recognize conventional characters. The characters had to be deformed or given unconventional shapes which detracted from their legibility. Moreover, printing means equipped with special type faces had to be employed for printing these characters.

(3) In some cases it was necessary that a code symbol be associated with each character, and the character recognition device responded to the code symbol rather than to the character itself. This likewise required the use of a special recording means to form the code symbols.

(4) Often these prior devices were unfeasible because they required the use of complicated moving parts such as rotary stencils which had to be matched with the characters.

An object of the present invention is to provide an improved character recognition device which avoids all of the objections mentioned above. That is to say, it does not require accurate positioning of the character, and it is capable of identifying conventional characters without the aid of code symbols or special configurations of the characters themselves. Moreover, it keeps the number of moving parts to a minimum and does not involve the use of rotary stencils or the like.

Another object is to provide a novel character recognition device which can be manufactured economically and which is adapted to read commercial paper and the like in a more rapid and reliable manner than was possible heretofore.

An important feature of the invention is the method by which certain points in the scanning field are selected for light-or-dark tests to determine the identity of the character that is being read. Successive-line scanning is employed, and each time a given edge or boundary of the character is encountered during an individual line scan, a starting signal is given to a distributor of the cumulative or progressive type, which distributor thereupon goes through an operative cycle or sequence in timed relation with the balance of the line scan. This last-mentioned step is performed not just once but many times for each character as the same is being scanned, causing the distributor to advance intermittently through a number of progressive cycles or sequences, one for each line scanned. At certain preselected phases in the cumulative or progressive operation of the distributor, the character recognition device "looks at" the elemental areas of the scanning field which corresponds to such phases. These selected areas or test points are located at various places throughout the scanning field, occurring in a number of different scanning lines rather than being disposed in a single line. This is important in that it enables the device to read characters having conventional, undistorted shapes, as will appear from the description hereinafter. Each character is recognized by its unique permutation of light and dark areas at the respective test points. Since the distributor is intermittently timed by, or synchronized with, the detection of a given edge or boundary of the character during each line scan, the device is not affected by inaccurate positioning of the characters.

The term "distributor" is given a broad meaning herein. It denotes any means for executing or manifesting a sequence or progression of events, whether this be by a series of discrete steps or by a continuous time function. Thus, in one embodiment of the invention the distributor comprises a binary counter and control means therefor which causes said counter to register a certain number of discrete counts for each line scanned. A chain of counting pulses begins each time a given starting edge of the character is detected in the course of a line scan. The counter maintains a cumulative total of these counts until the entire field has been scanned, whereupon it is reset. At certain preselected counts which correspond to predetermined test points the counter and its associated circuitry condition a set of storage devices to register a permutation of light and dark signals identifying the scanned character. While each test point may occupy different positions for the various characters, it has the same invariant count for all characters. This greatly facilitates the identification of these characters.

In another embodiment of the invention, an image of the scanned character is displayed on the screen of a cathode ray tube. The sweep circuit of this tube is so arranged that each vertical sweep oscillation thereof is triggered to commence when a given starting edge of the character is detected in the course of a line scan. The image of the character is so transformed by this process that the starting edge of the character always appears to lie on a predetermined straight line. The test points are located at invariant positions on these transformed character images. Optical energy from the test points is distributed to light-sensitive devices such as photocells which control storage elements for registering a permutation of light and dark signals.

Thus, by combining a multi-line scanning means with a distributor which is triggered or synchronized in response to a given reference edge or boundary of the scanned character, this invention makes it possible to define each character in terms of horizontally and vertically spaced "test points" which are arranged in a unique geometric pattern for each character (prior to transformation thereof) but which, in effect, have invariant coordinates for the several characters, as measured by the operation of the distributor. This feature is common to both of the embodiments described above.

Other objects and features of the invention will be pointed out in the following description and claims and illustrated in the accompanying drawings, which disclose, by way of examples, the principle of the invention and the best mode which has been contemplated of applying that principle.

Figure 5:
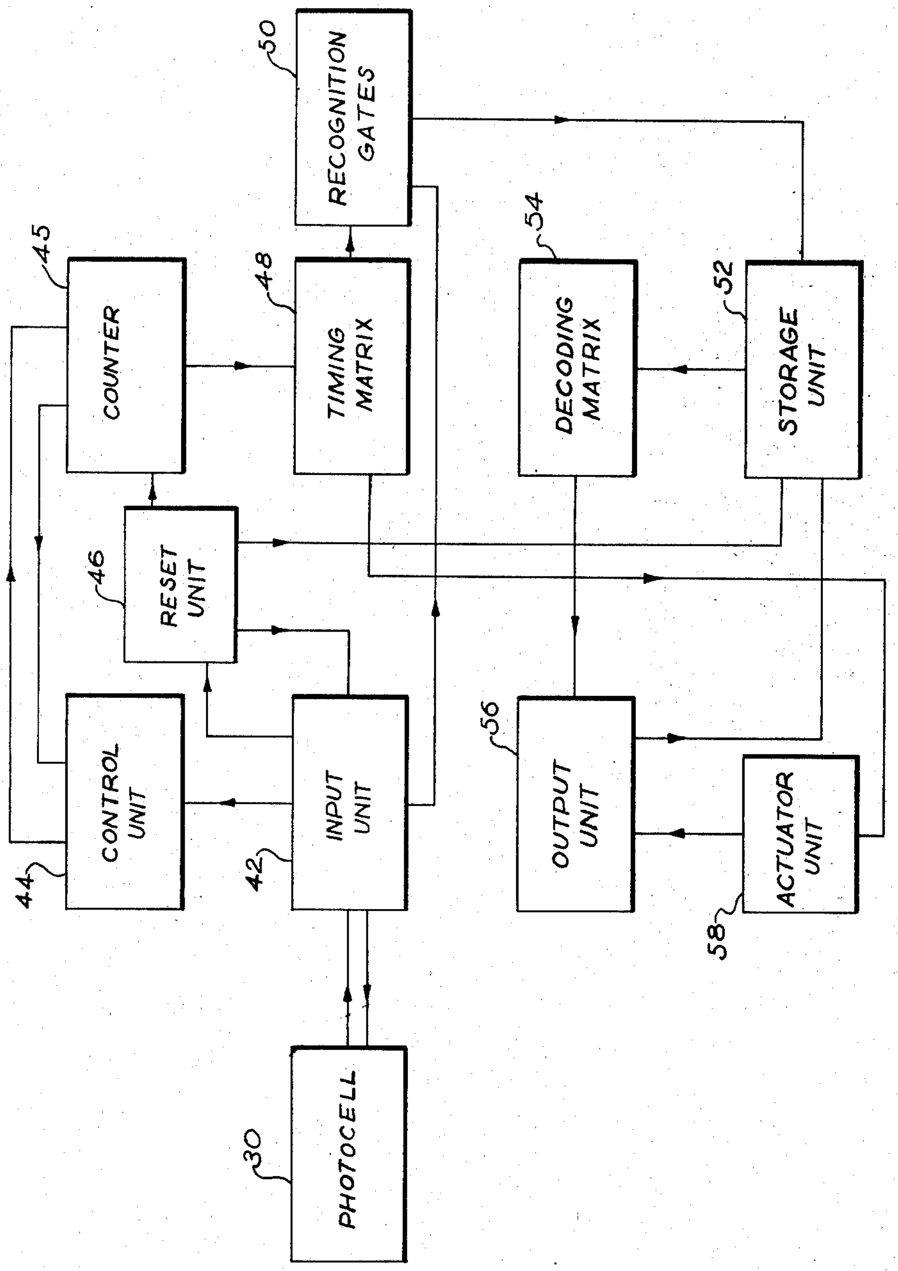
Fig. 5 is a block diagram showing the arrangement of components in one embodiment of the invention.

Figs. 7A to 7M constitute a detailed circuit diagram of the system represented in Fig. 5.

Figure 7A:
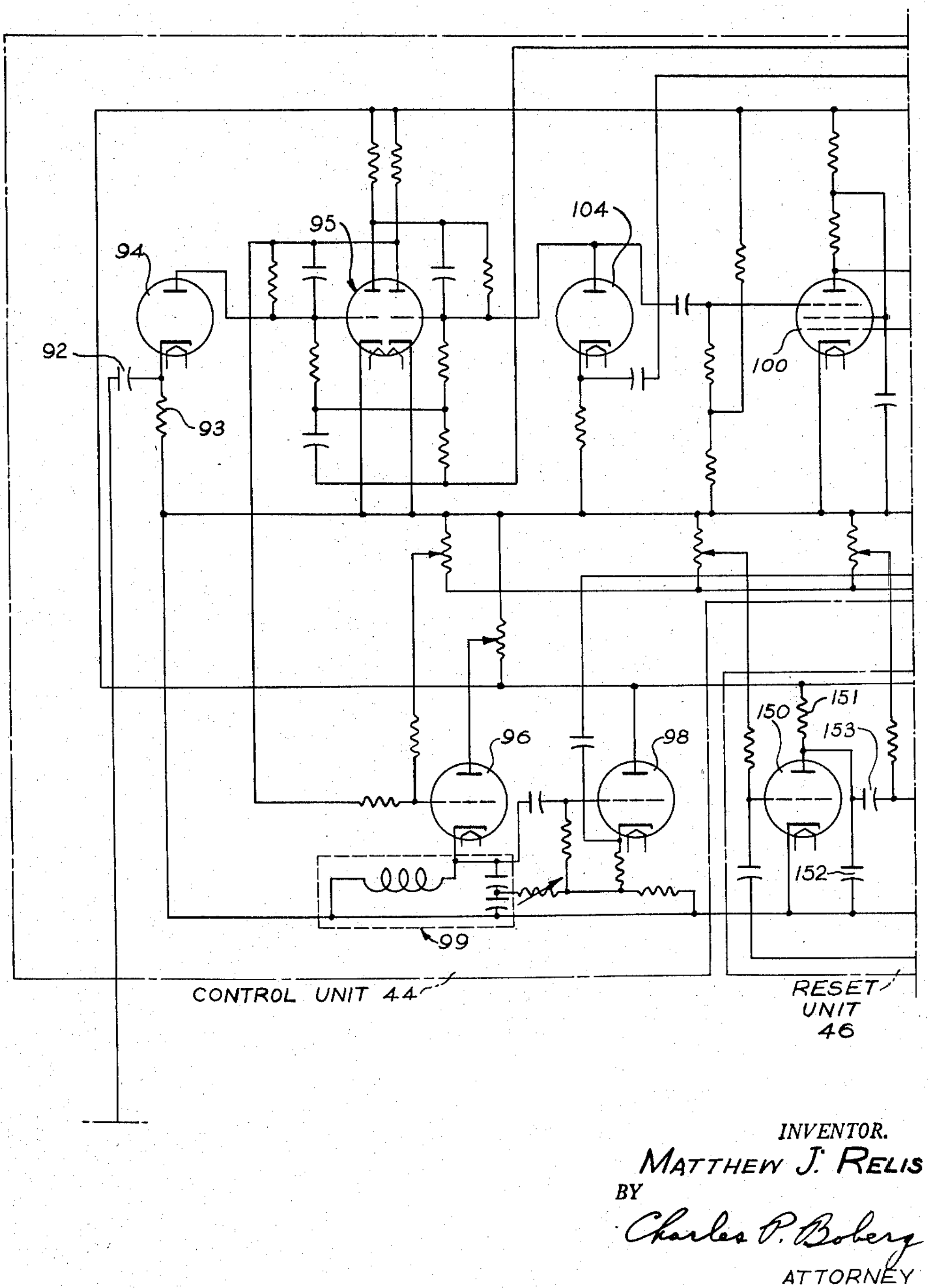
Figure 7B:
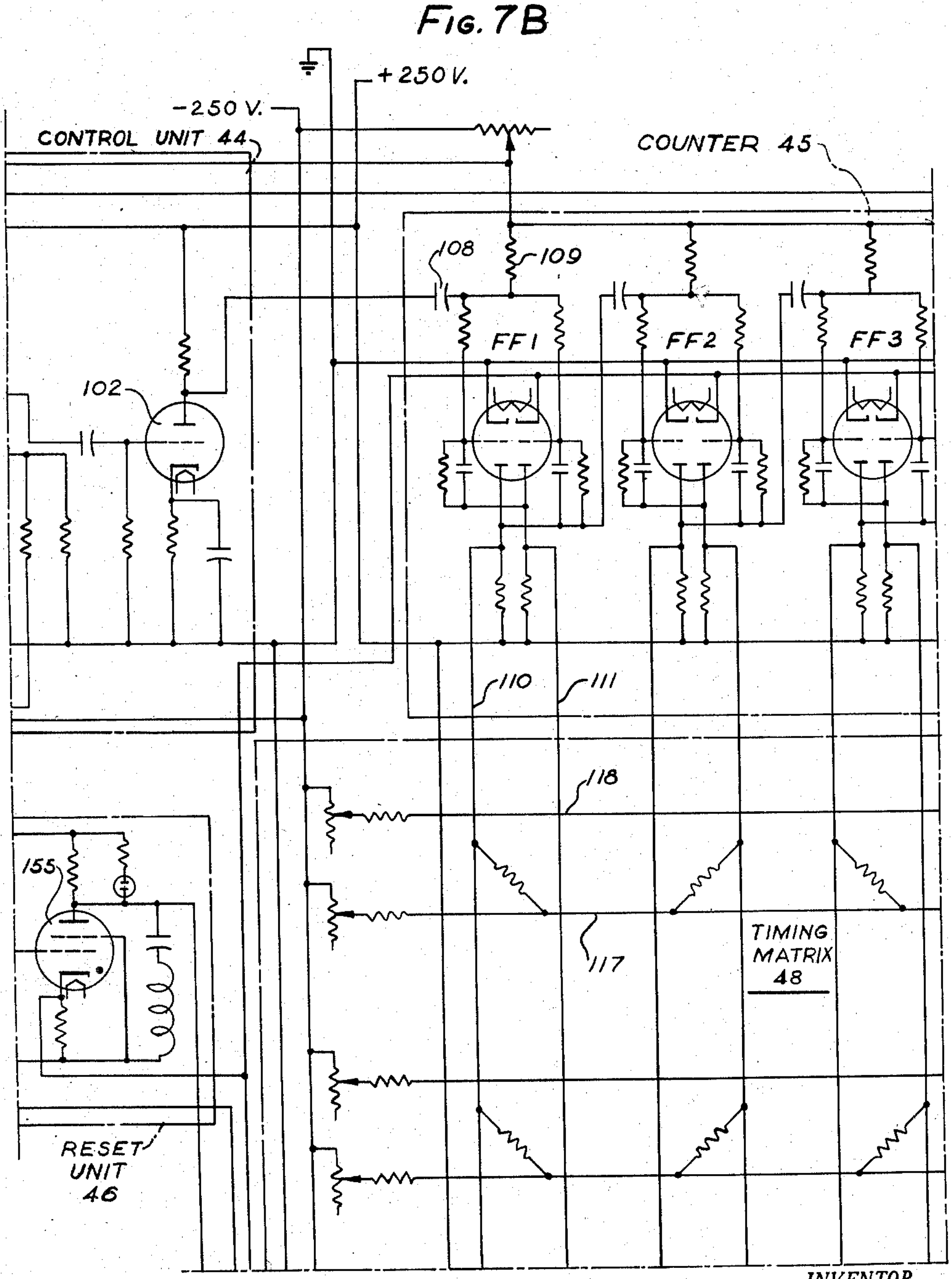
Figure 7C:
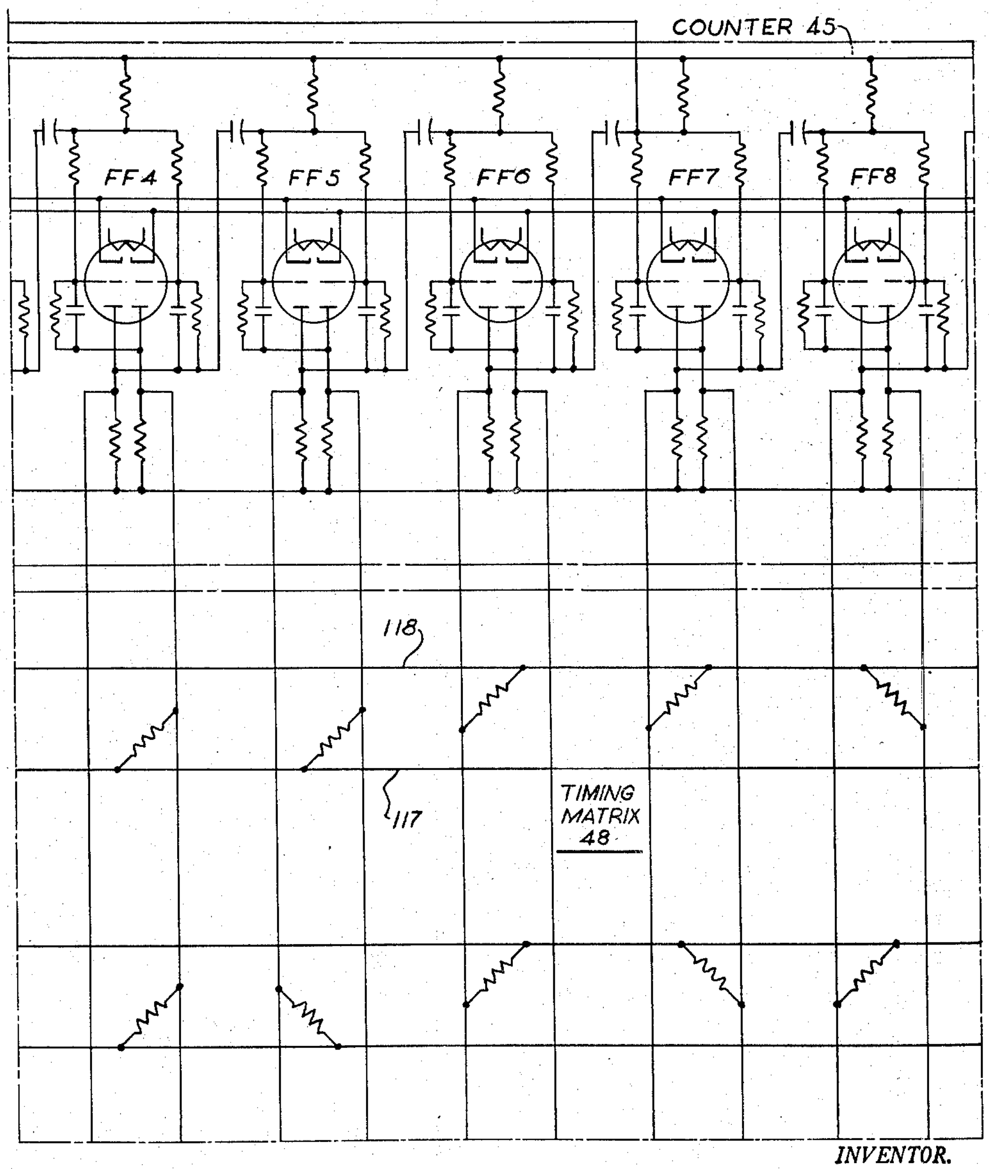
Figure 7D:
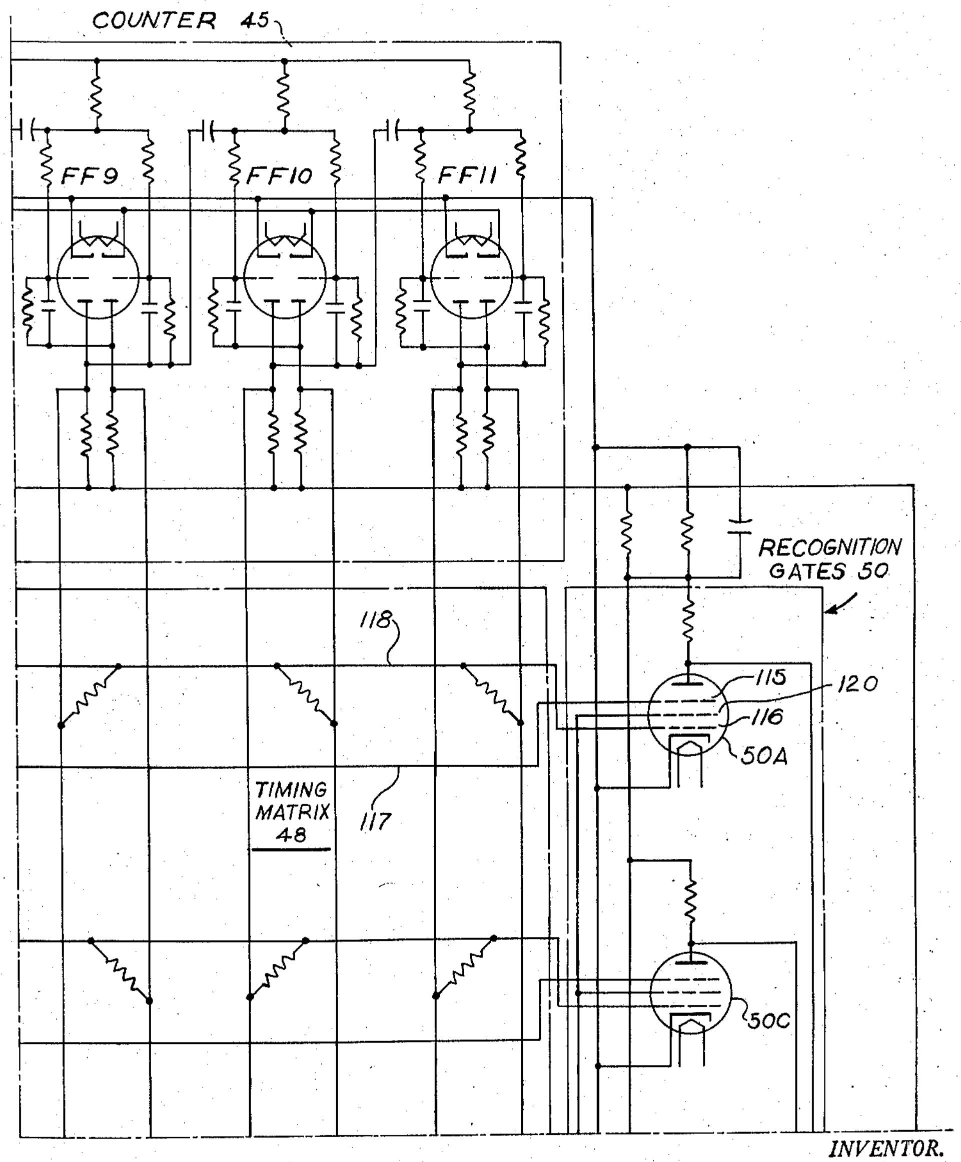
Figure 7E:
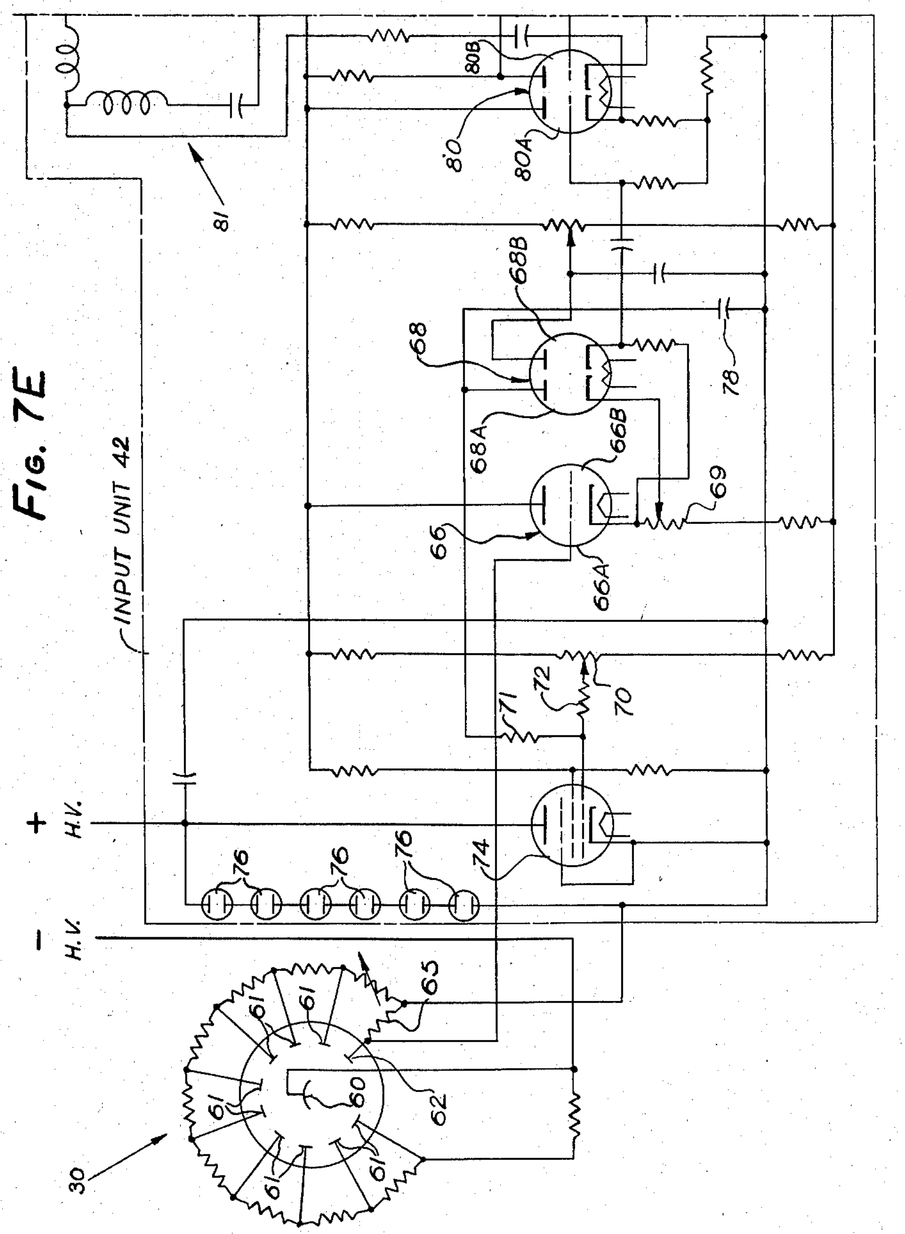
Figure 7F:
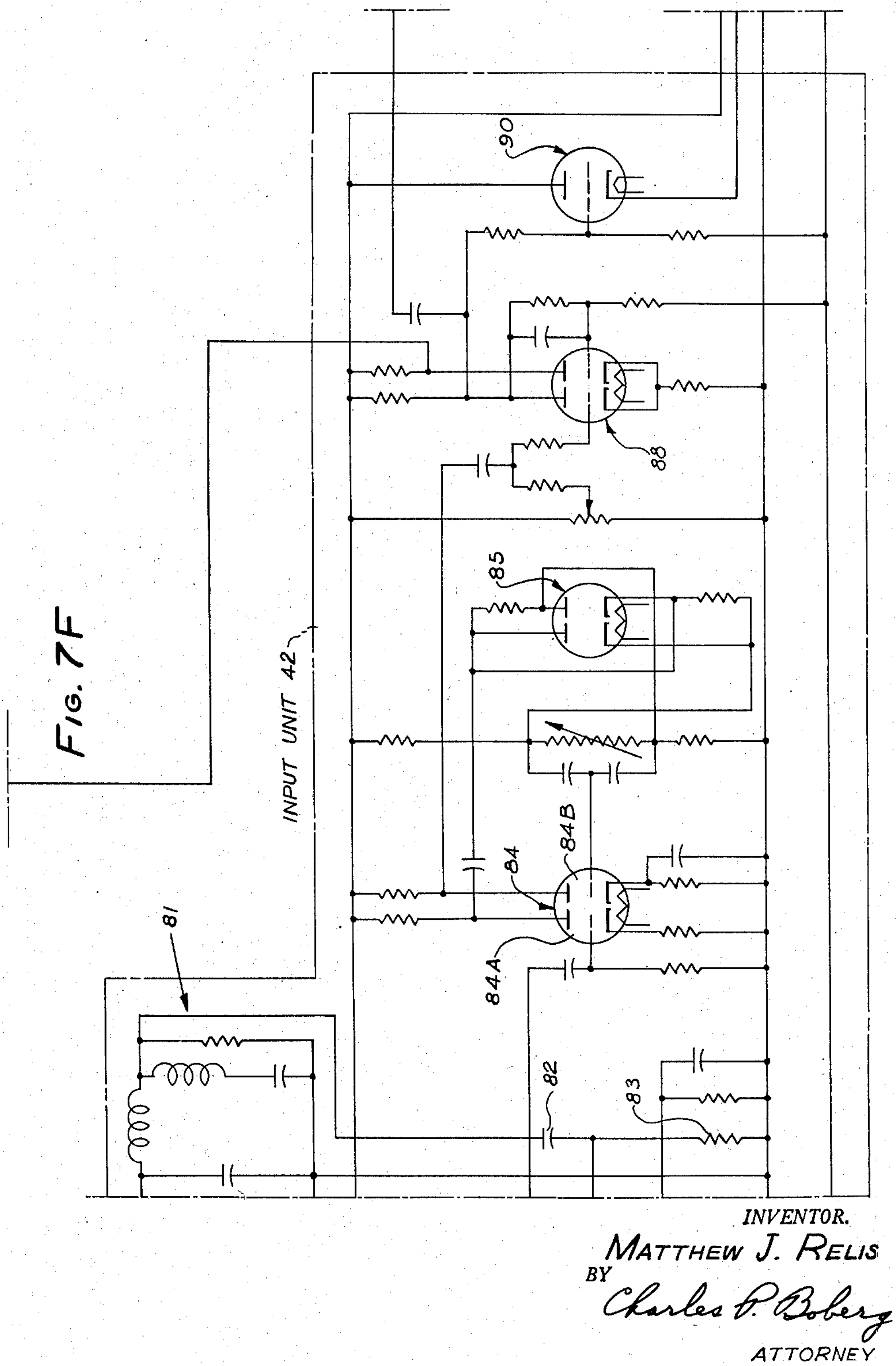
Figure 7G:
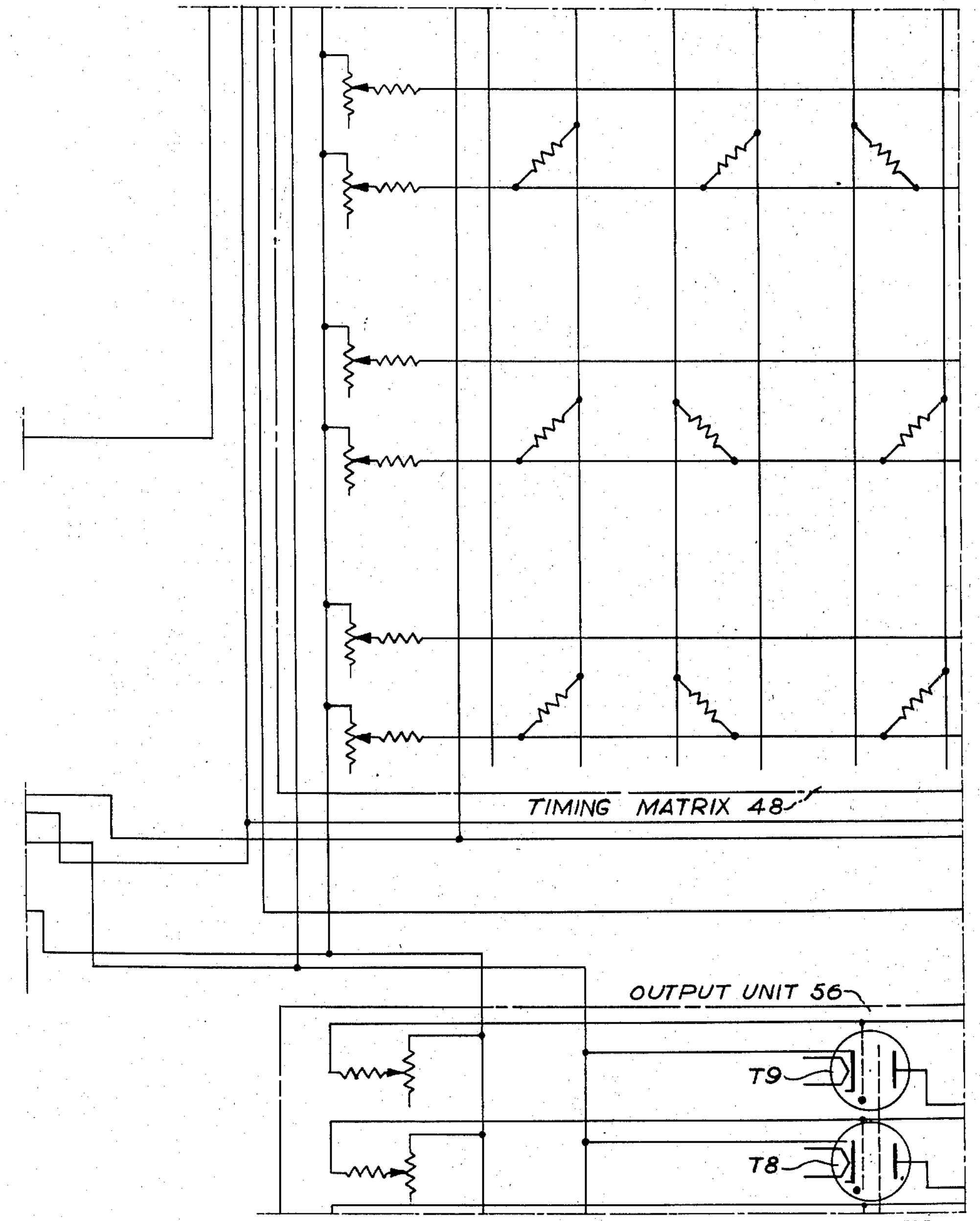
Figure 7H:
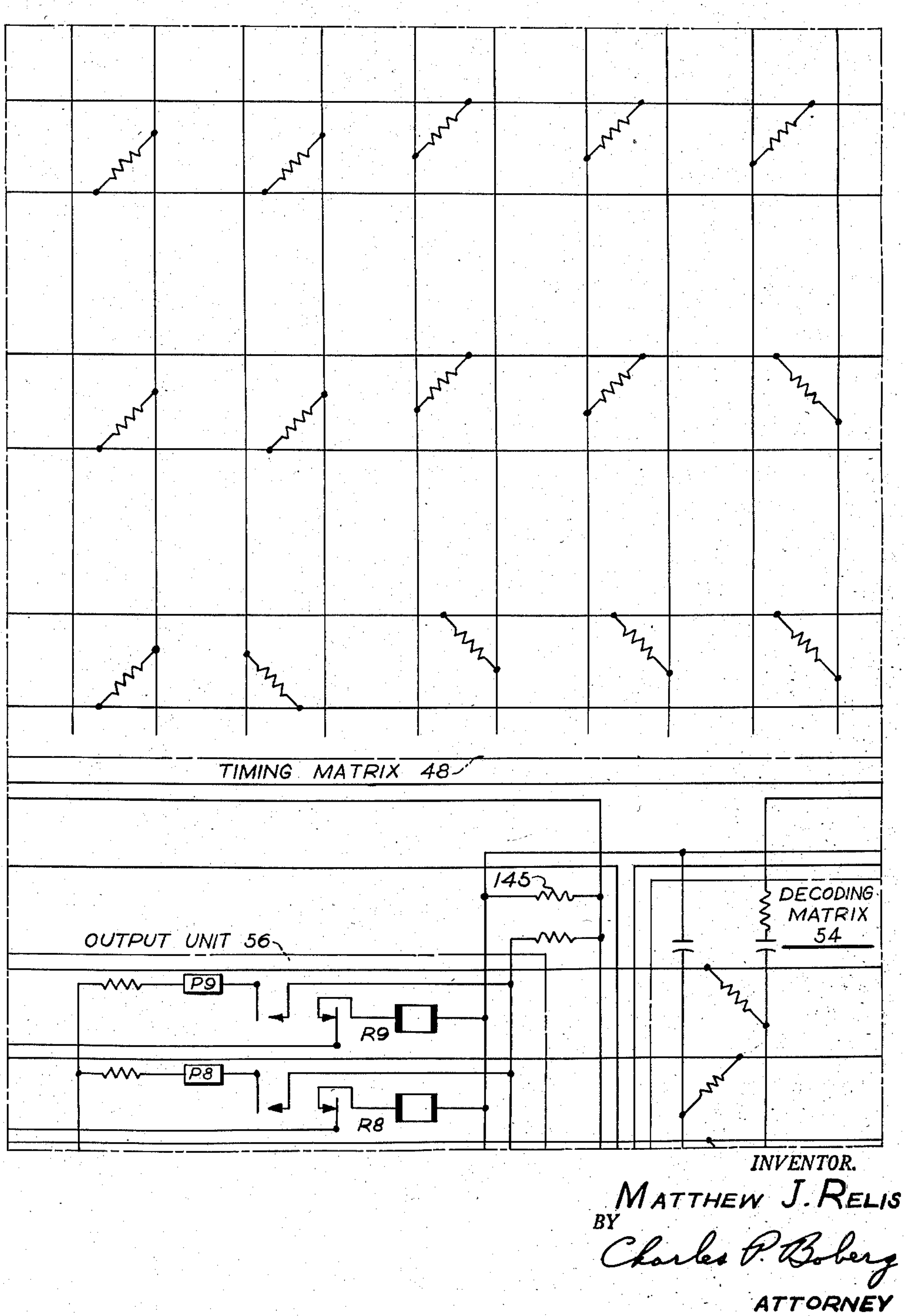
Figure 7J:
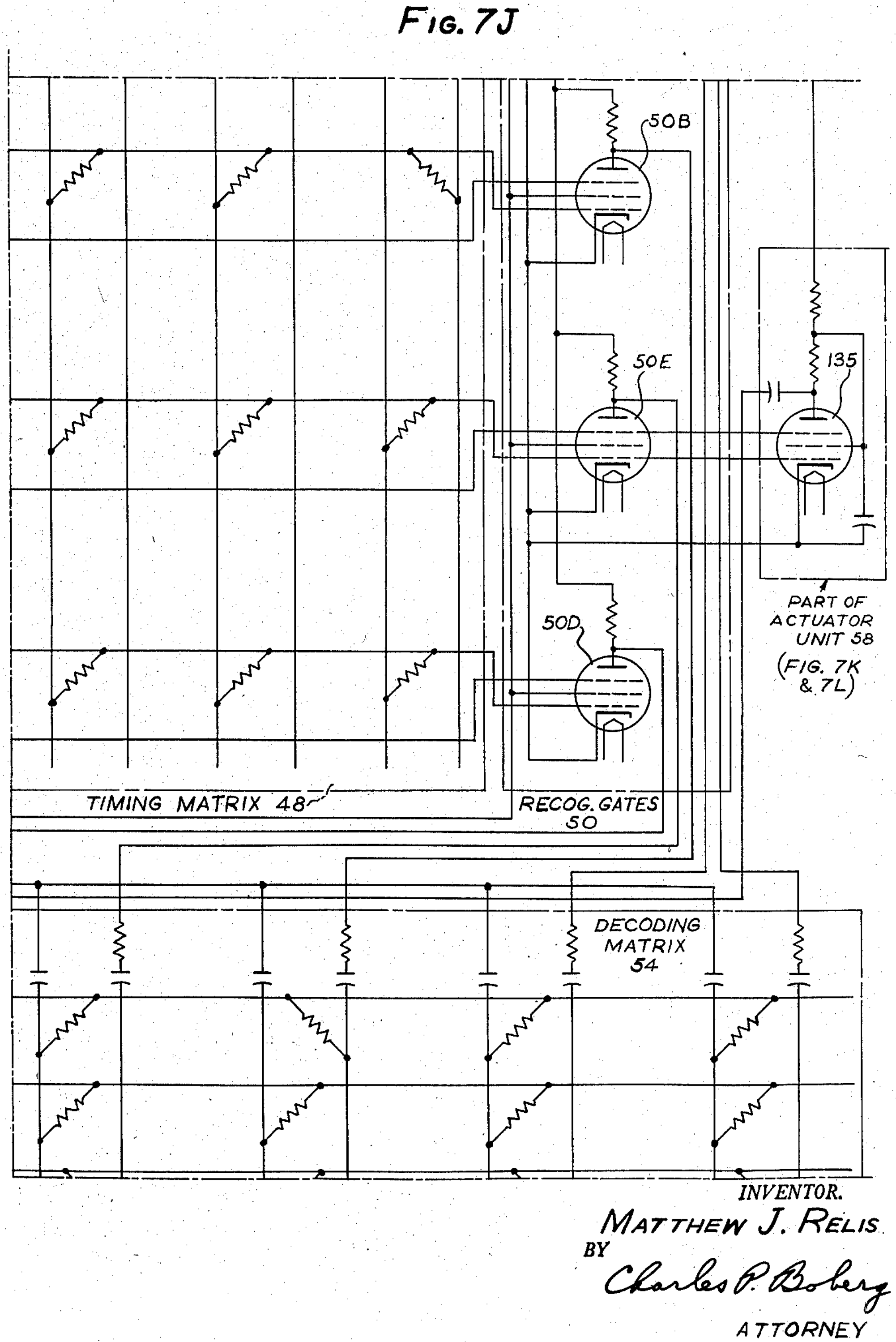
Figures 7K, 8:
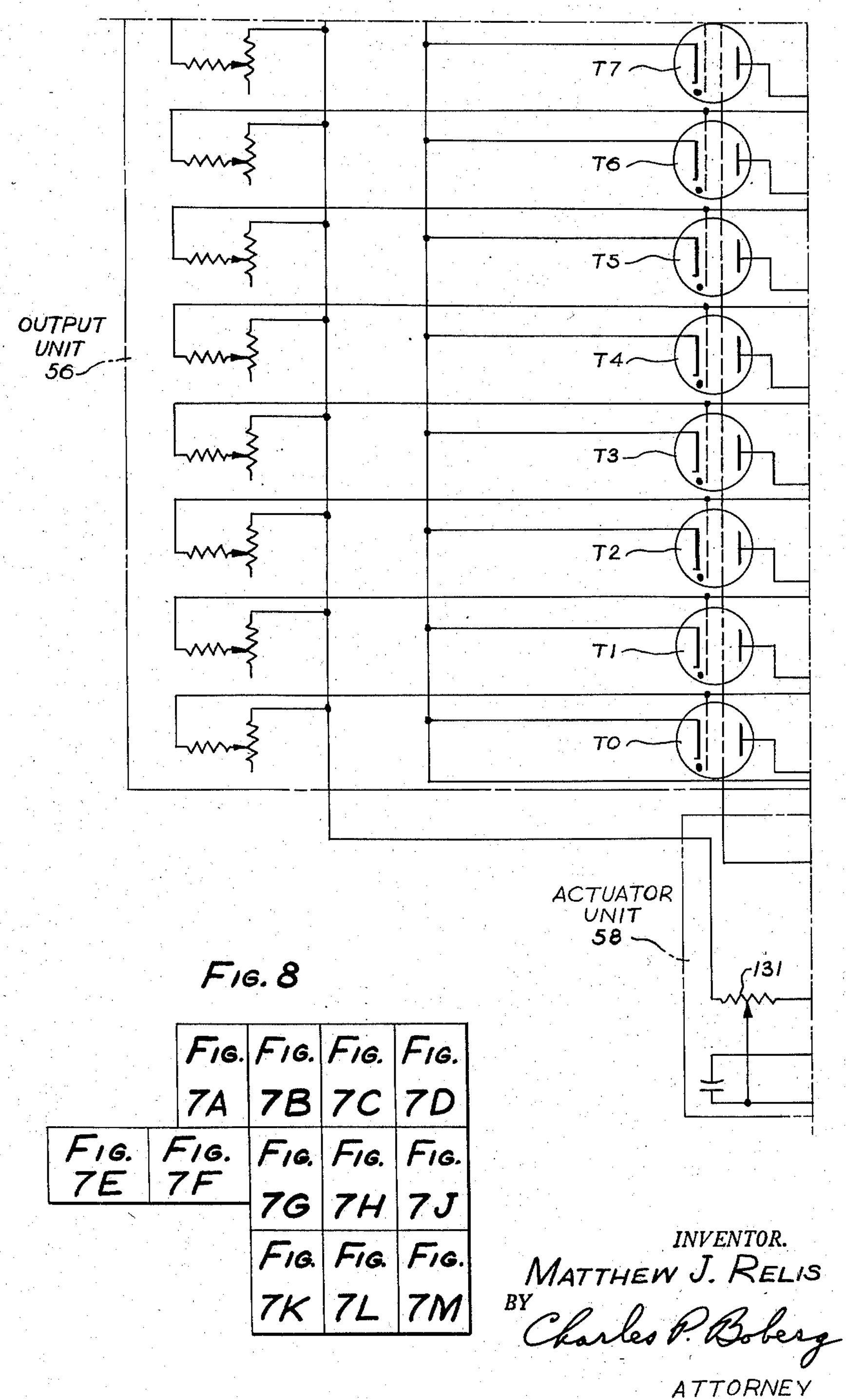

Fig. 8 (on the same sheet as Fig. 7K) is a diagram showing the manner in which Figs. 7A to 7M should be joined.

Figure 9A:
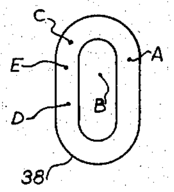
Figure 9B:
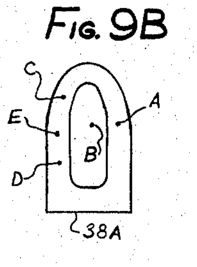
Figure 9L:
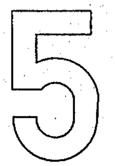
Figure 9M:
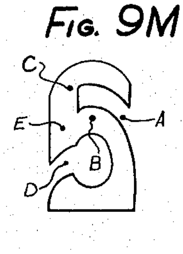
Figure 9C:
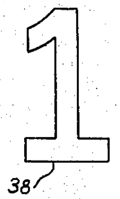
Figure 9D:
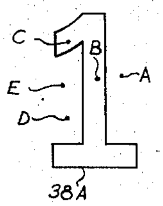
Figure 9N:
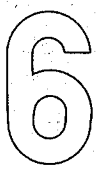
Figure 9P:
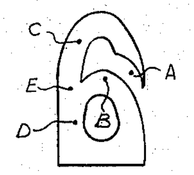
Figure 9E:
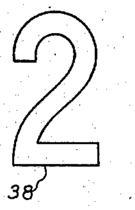
Figure 9F:
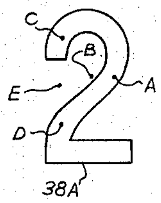
Figure 9Q:
Figure 9R:
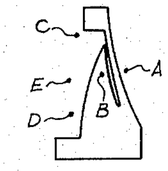
Figure 9G:
Figure 9H:
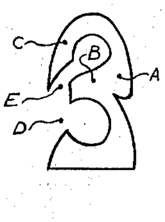
Figure 9S:
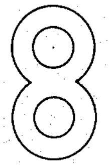
Figure 9T:
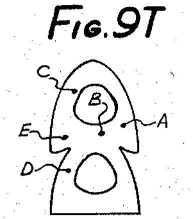
Figure 9J:
Figure 9K:
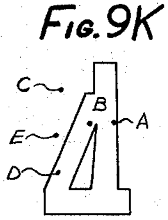
Figure 9U:
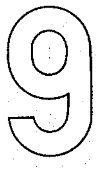
Figure 9V:
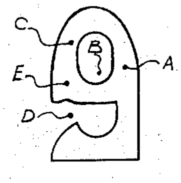

Fig. 9A to 9V are views of certain Arabic characters before and after transformation thereof in accordance with the principles of the invention.

Figure 10:
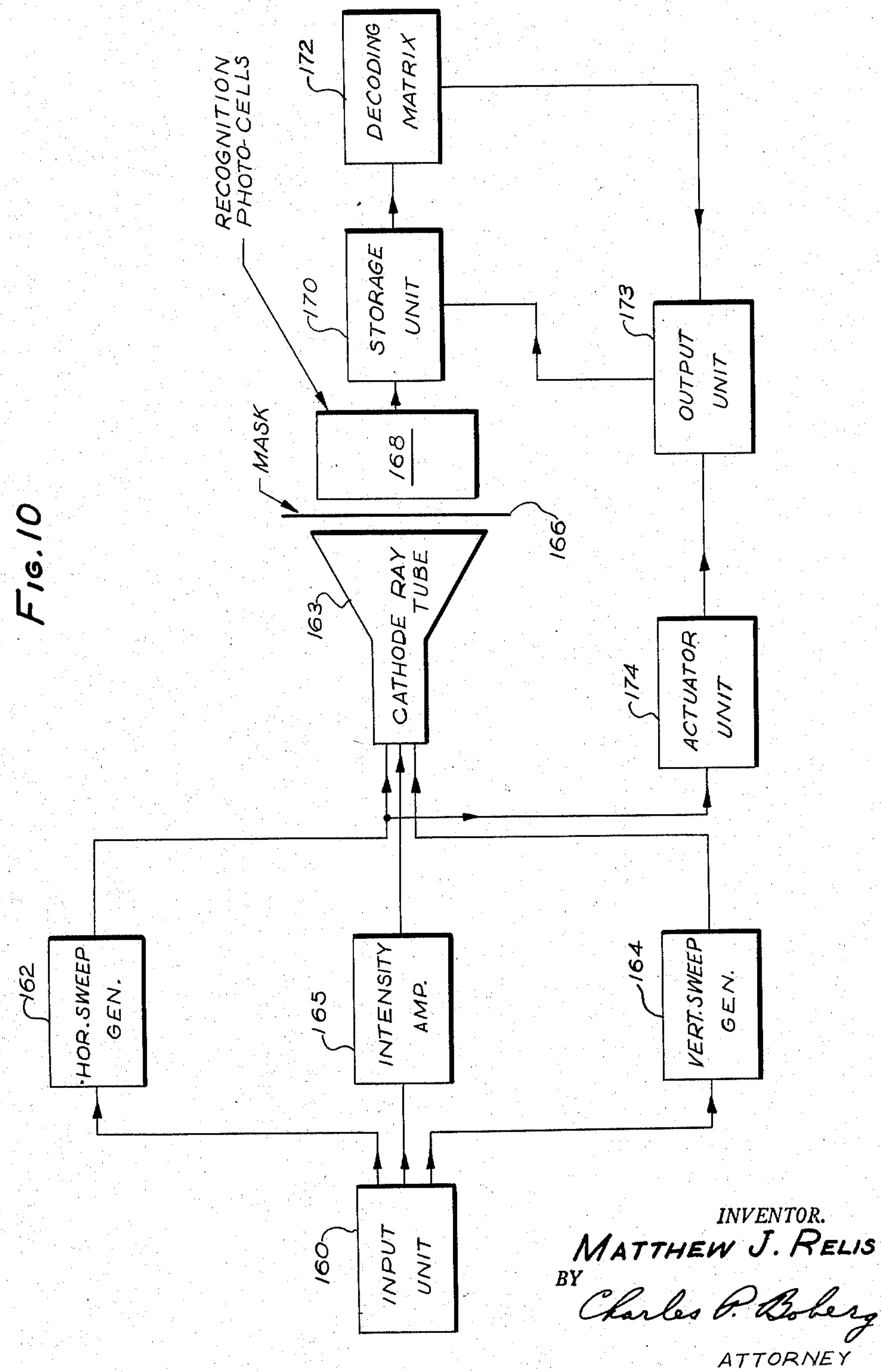

Fig. 10 is a schematic illustration of a second embodiment of the invention.

In describing the character recognition device illustrated herein, it will be assumed that this device is employed for the purpose of reading numerical information on documents such as checks or other commercial papers. Thus, referring to Fig. 1, a sheet or document 15 is passed through the scanning means of the character recognition device, which reads a serial number N printed in a predetermined area 16 on the document 15. In the present example the characters consist of digits, but the invention is not limited, of course, to the reading of the numerical information and may be adapted for reading alphabetical characters or other symbols as well.

The serial numbers N printed on the various documents of a run or series do not occupy exactly identical positions thereon, due to various inaccuracies which must be tolerated. It is assumed, however, that each serial number N will lie within a predetermined scanning area 16, the center of which coincides with the nominal center of the serial number N. That is to say, the individual characters of the number N may be displaced horizontally or vertically from their nominal positions due to the tolerances just mentioned, but so long as the characters lie entirely within the area 16, this invention will enable said characters to be identified with accuracy notwithstanding such variations.

Figure 2:
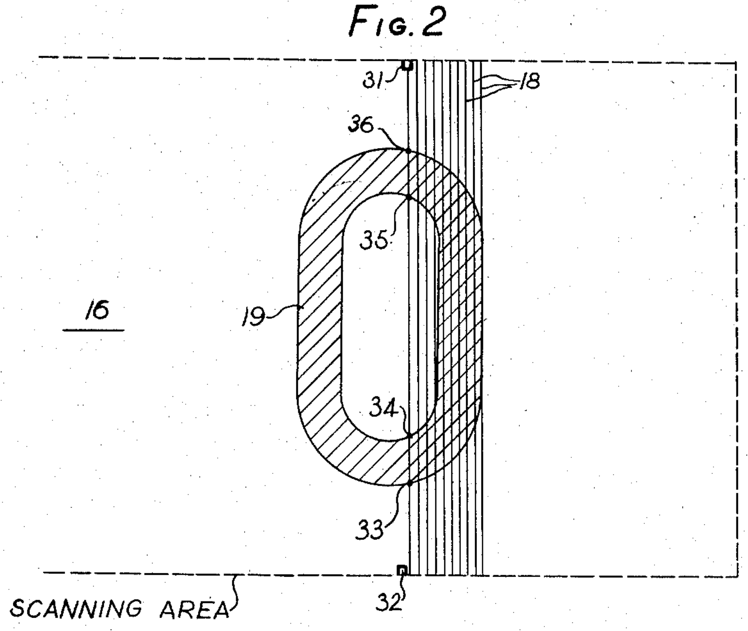
Fig. 2 is a diagrammatic representation of the manner in which a field containing a character is scanned.

The document 15 is fed (by means not shown) in the direction indicated by the arrow, permitting the area 16 thereon to be traversed by a rapidly moving light beam or "pencil" of light 17. The scanning spot projected on the document 15 by the beam 17 executes a rapid vertical scan. A slower horizontal scan is produced by the motion of the document 15. By virtue of these scanning movements, a plurality of vertical scan lines 18, Fig. 2, are traced within the scanning area 16. The act of scanning across the area 16, along one of the scan lines 18, will be referred to as a "vertical scan." In the present instance approximately 35 vertical scans are performed for each character 19, Fig. 2, it being understood, of course, that the exact number of vertical scans per character is largely a matter of choice.

Figure 1:
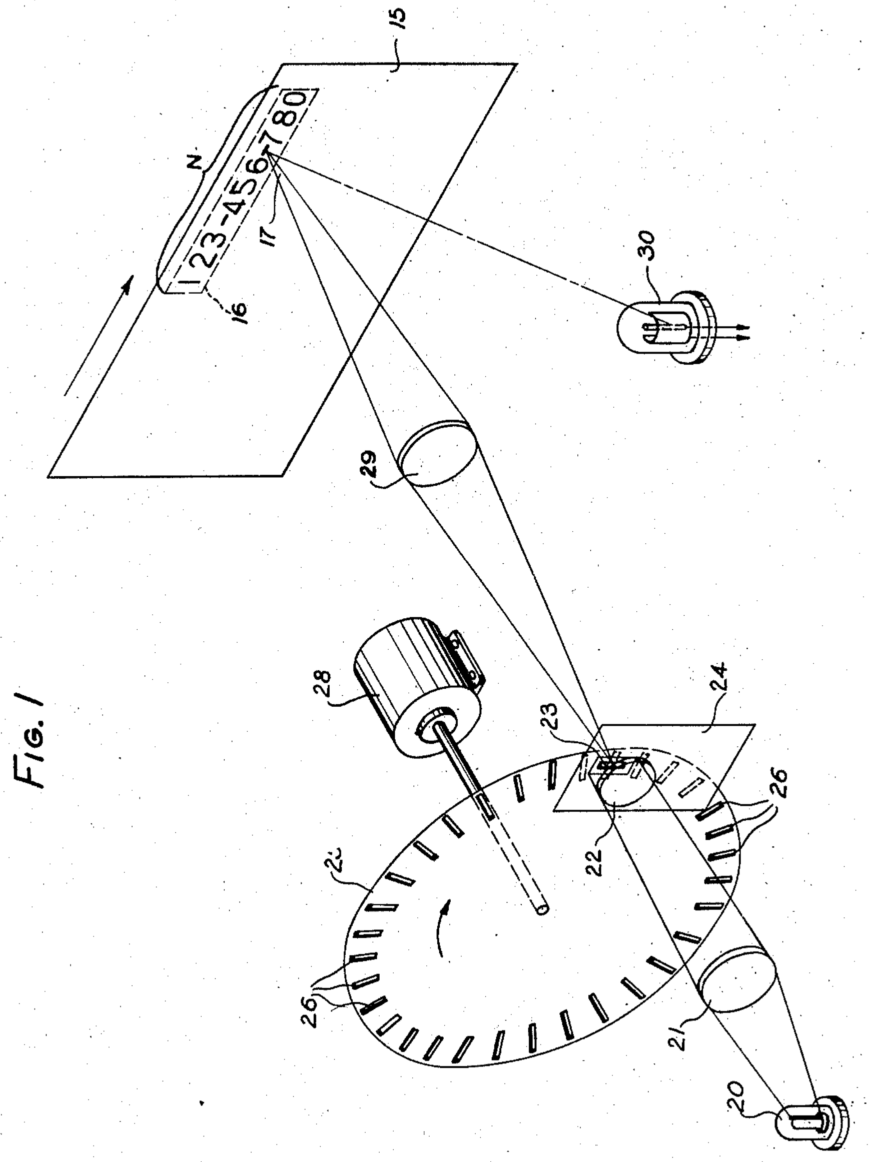
Fig. 1 is a schematic, perspective view of an optical scanning means which is adapted for use with the present invention.

The type of scanning device illustrated in Fig. 1 has been found to be well suited for the purposes of this invention. Other equally satisfactory devices may be employed, such as an optical image dissector or an electronic flying spot scanner. Referring to Fig. 1, a beam of light from a light source 20 is projected through lenses 21 and 22 to an approximately vertical slit 23 in a stationary mask 24. Preferably the light source 20 comprises a lamp having a linear luminous area oriented parallel to the slit 23, which subtends a fraction of the width and length of the luminous area. Just beyond the stationary mask 24 is a rotary scanning disc 25 having radial slits 26 therein near its periphery. The disc 25 is rotated to move the radial slits 26 in succession past the slit 23, and the arrangement is such that when the normal projection of each slit 26 upon the mask 24 is positioned to bisect the slit 23, said projection also is nearly perpendicular to the slit 23. Moreover, the length of the slit 23 and the peripheral spacing of the slits 26 are such that each adjoining pair of slits 26, as it moves past the mask 24, is spanned by the slit 23 for a brief instant, the purpose of this being explained presently.

The scanning disc 25 is driven at a uniform speed by a motor 28, causing each of the slits 26 in turn to pass the slit 23. The light from the source 20 passes through the parallelogram-shaped opening which is defined by the crossed slits 23 and 26. The virtual light source afforded by this opening moves in a straight line with approximately uniform motion, thereby executing the vertical scan. The linear path of this virtual light source is not truly vertical but is skewed slightly to compensate for the horizontal motion of the document 15, with the result that the scanning lines traced on the document are truly vertical; that is, they are perpendicular to the direction in which the document is being fed. It will be understood that the terms "horizontal" and "vertical" are employed in a relative sense herein to facilitate the description.

While the horizontal scan is generated by the motion of the document 15, it is evident that other methods of generating the horizontal scan may be feasible. Preferably, the horizontal scan should have a substantially uniform speed during the reading operation. It is advantageous to have the motor 28 which drives the scanning disc 25 also drive the means (not shown) for feeding the documents 15 at least during the time when the area 16 containing the number N is being scanned. If desired, other means can be utilized for advancing the sheet 15 at a different rate after the number N has been scanned, with suitable means being provided to disable the character recognition circuits during the intervals between serial numbers.

Referring again to Fig. 2, each scanning beam 17, as it impinges upon the document 15, illuminates a spot such as 31 (herein referred to as the "scanning spot") which traces a vertical scan line 18 as it moves upward across the area 16. As the next succeeding light beam impinges upon the area 16, another scanning spot 32 will be defined therein. The period of overlap of the two scanning spots in time is very brief, and normally only one scanning spot is present in the area 16 at any given instant. The light reflected from the scanning spot (that is, from the spot on the surface of the document which is illuminated by the light beam) is directed to a photocell 30, Fig. 1, which responds to generate a signal representing the variations in the reflectance of the surface as the scanning spot moves across the area 16 in which the character is contained.

Figure 3:
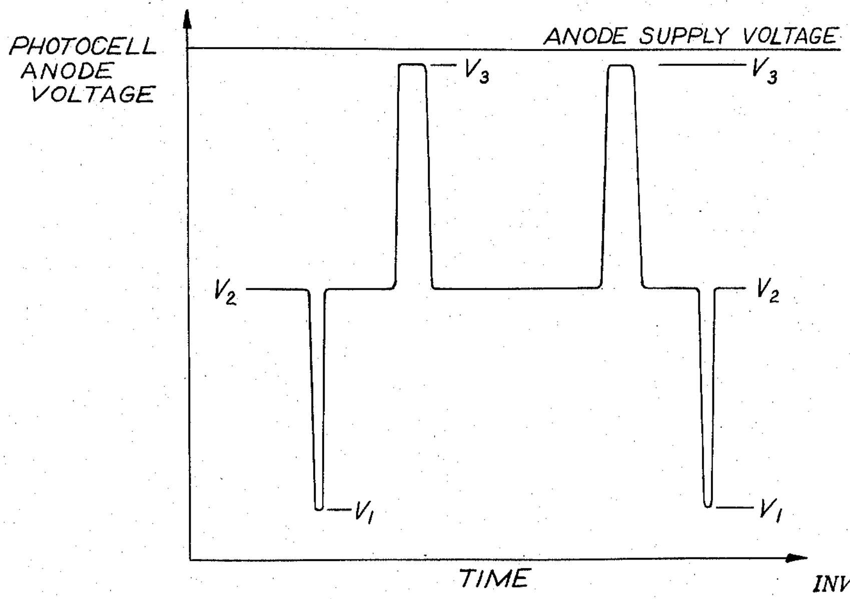
Fig. 3 is a graph of the output signal from the photocell in the scanning device.

The action of the photocell 30, Fig. 1, in response to the scanning of a character will now be considered. Taking the character 19, Fig. 2, as an example (it being assumed that this character is a solid black "0" printed on a white background), the output voltage of the photocell will vary in the manner graphically illustrated by Fig. 3 during the period when the scanning spot 31, Fig. 2, is performing its vertical scan. (The description here refers to a photocell having its load in the anode circuit, as in the case of the photocell 30, Fig. 7E.) Thus, at the beginning of the line, when two scanning spots are present at the same time, the anode voltage of the photocell drops to its lowermost value V1. With only one scanning spot present, the white background of the scanning area 16 produces the normal "white" signal voltage V2. Between the points 33 and 34, Fig. 2, when the scanning spot is traversing a solid black portion of the character, the photocell anode voltage rises to the "black" level V3, Fig. 3. Between the points 34 and 35, when the white field is being scanned, the output voltage drops back again to the white level V2, as shown in Fig. 3. Then, between the points 35 and 36, Fig. 2, it rises once more to the black level V3, after which it is restored to the normal white level V2 until the end of the line is reached.

At the instant when two scanning spots 31 and 32, Fig. 2, are simultaneously present in the area 16, during the brief period of overlap mentioned above, there will be a dip of the photocell anode voltage to the level V1 due to the increased illumination. The transition pulse thus generated is employed to regulate the output signal level of the photocell 30, which in this case is a photocell of the secondary emission multiplier type. The first of the black signal pulses V3 following this transition pulse serves as a trigger or synchronizing pulse to initiate the operation of a distributor, as will be explained later. These black signal pulses also supply the intelligible portion of the video signal which is to be analyzed for identifying the character.

The apparatus herein disclosed functions in such a way that it establishes, in effect, a unique coordinate system for each form of character which is being scanned. This coordinate system is referred to a given edge or boundary of the character, hereinafter designated as the "starting edge." The starting edge may be defined as the locus of all points on the character which are encountered first by the respective scanning spots in the various vertical scans.

Figure 4:
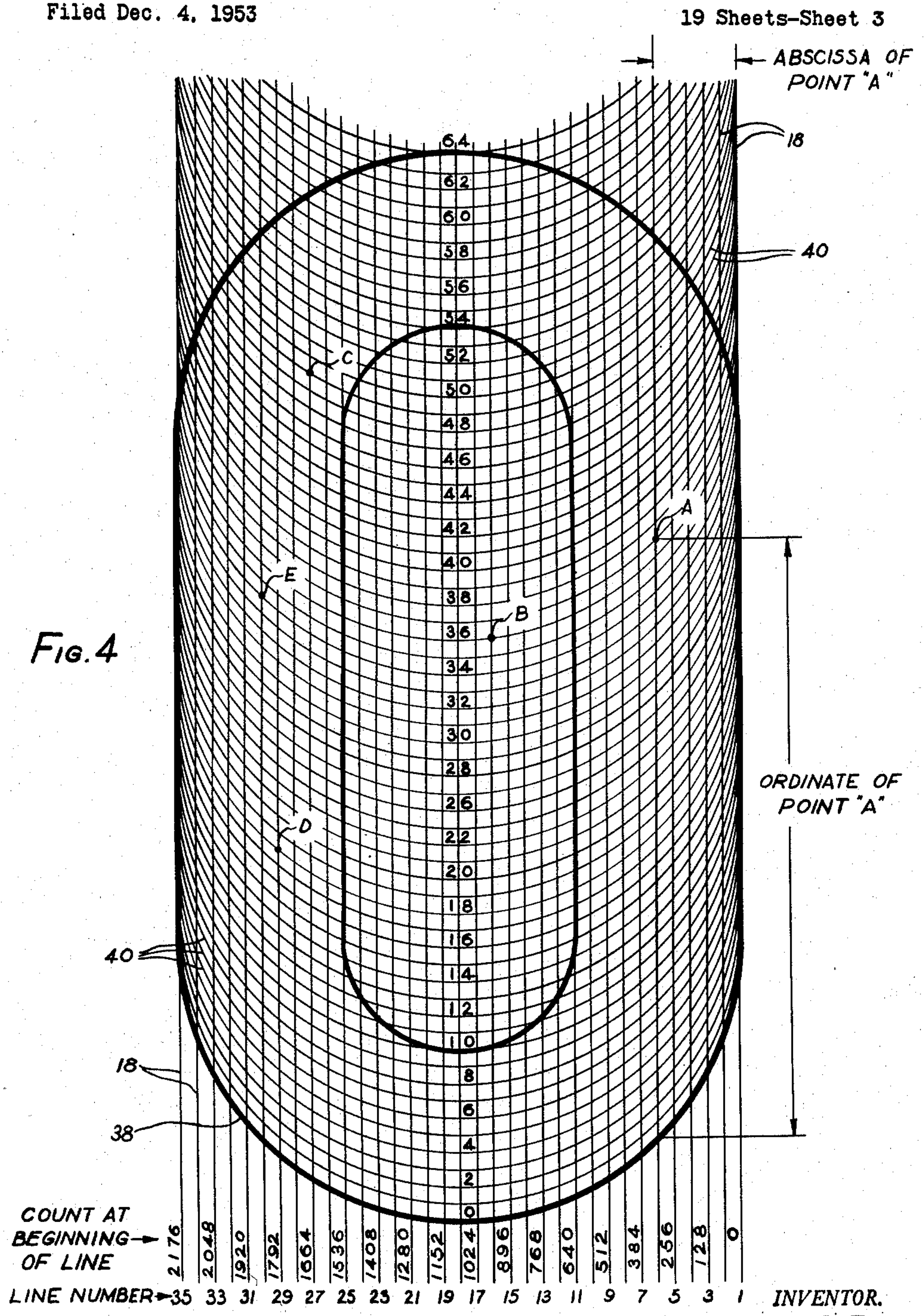
Fig. 4 is a graphical representation of a coordinate system established by the character recognition device, with reference to the numeral "0."

Referring to Fig. 4, which graphically illustrates on a magnified scale the coordinate system for the character "0," the starting edge in this instance is the curved line 38 constituting the lowermost boundary of the character. A parametric family of equally spaced curves 40, in which the shape of each curve is the same as that of the starting edge 38 and in which the parameter is the vertical distance, is drawn upon this figure for reference purposes. The starting edge 38 is a member of this family of curves. Also shown in this figure is a family of equally spaced, parallel, vertical lines 18 corresponding respectively to the scan lines 18 shown in Fig. 2. For convenience hereinafter, the lines 18 and the curves 40 will be referred to simply as "vertical lines" and "transverse lines."

The same set of vertical lines 18 may be utilized for all characters, but the configurations of the transverse lines 40 will depend, of course, upon the configuration of the starting edge 38 for each individual character. Thus, each character will have its own individual coordinate system, except that those characters which have similar starting edges will also have similar coordinate systems.

Fig. 4 shows only the boundaries of the character "0." Actually, in this example, the area enclosed within these boundaries is assumed to be solid black and the remaining areas are white. Alternative color schemes may be employed, if desired.

It will be assumed herein that the coordinate system for each character includes approximately thirty-five of the vertical lines 18, sixty-four of the transverse lines 40, and the starting edge 38 (which constitutes the zero or reference axis of the lines 40). Now let it be assumed that a cumulative count is made of the points at which the various lines 18 intersect the lines 40, commencing with (but excluding) the intersection of the line 38 and the extreme right-hand line 18, Fig. 4, thence proceeding vertically upward along this righthand line 18 through the sixty-four intersection points to the uppermost line 40 (not completely shown in Fig. 4), then interrupting the count and commencing again with the intersection of the second line 18 and the lowermost line 40 (excluding the line 38), proceeding upward along this line 18 through sixty-four intersections to the top, and so on, and proceeding in this fashion across the entire character. Thus, the total count will be increased by "64" for each vertical line 18, since each vertical line 18 intersects sixty-four transverse lines 40. (Intersections with the starting edge 38 are not counted since they are merely the starting points.)

In accordance with the invention, certain ones of the aforesaid intersection points are selected for test purposes to determine the identity of the character according to the pattern of white and black areas at the selected points. These test points are respectively designated A, B, C, D and E in Fig. 4. The respective positions of these points are defined by their coordinates and also by the total count which is registered at each of these test points within the coordinate system just described. In this coordinate system, the abscissa of each point is the number of the vertical line 18 on which it is located, and the ordinate of said point is the number of the transverse line 40 whereon the point is situated. These relationships are brought out in Table I below:

TABLE I

*Coordinates*

| Test Point | Vertical Line No. (Abscissa) | Transverse Line No. (Ordinate) | Total Count |
|---|---|---|---|
| A | 6 | 37 | 357 |
| B | 16 | 36 | 996 |
| C | 27 | 49 | 1,713 |
| D | 29 | 18 | 1,810 |
| E | 30 | 34 | 1,890 |

Taking point A, for example, this point is located at the intersection of the 6th vertical line and the 37th transverse line, and it is the 357th intersection point to be counted in the coordinate system. Hence, the location of the point A may be defined by the abscissa 6 and the ordinate 37, or by the total count 357. The positions of the other test points B, C, D and E may be analyzed similarly.

It will be noted from the above table that the counting and hence the coordinate system may in this case be terminated anywhere after the 1890th count, which is the highest count used. It should be noted further that the locations of the test points are strictly empirical, and the values herein selected are not necessarily appropriate in all situations. The test points are located in the most optimum fashion to insure accurate identification of the characters, and resort to cut-and-try methods may be necessary to achieve this. Once a set of test points has been selected, however, the coordinates of each test point will be identical for all characters in that particular group. Under some conditions it may be necessary to utilize all of the information represented by the test points, and there may be other instances where a smaller number of test points will suffice for identifying certain characters.

Another feature to be noted in this connection is that each test point, in addition to representing a particular cumulative count or a particular pair of coordinates, may be regarded also as representing a certain amount of integrated, elapsed time from the instant when the scanning spot first encounters the character to the instant when the test point is detected, taking into account only the time during which the scanning spot is within the coordinate system for that particular character. In one embodiment of the invention which is about to be described, this elapsed time is represented by the total number of uniformly spaced pulses occurring in given pulse trains. For convenience, each of these pulses is so timed that it corresponds to a particular one of the aforesaid intersection points, so that by maintaining a count of the pulses, one thereby maintains a count of the intersection points in the coordinate system.

The coordinate system for each and every character is referred to the starting edge of that character, which by definition is the locus of all points on the character which are encountered first by the respective scanning spots as they execute the various vertical scans. The coordinate system also is referred to another reference axis that joins the right-hand extremity of the starting edge (Fig. 4). As will be pointed out hereinafter, it is possible also to refer the entire coordinate system to a starting point, namely, the point on the character which is first encountered by any of the scanning spots. This is a speial case, however, and will not be considered for the present. Actually the starting edge of the character may be discontinuous, as in the case of the numeral "7" for example, where the starting edge is interrupted at the lowermost extremity of the character and resumes again at a point on the horizontal bar of the "7" directly above the left end of said lowermost extremity.

It is important to note that irrespective of the configuration of the starting edge, which is the zero reference axis for all of the ordinates, the coordinates of each test point (Table I) are identical for all characters in the group. The relative physical positions of the test points on the document may vary from character to character, but the coordinates of each test point are invariant. The test points are purely imaginative insofar as their physical properties are concerned, and the coordinate system to which these test points are referred likewise has no actual physical existence. Nevertheless, by means of the present invention, the aforesaid test points are employed in a very real sense to identfy each character according to the pattern of "white" and "black" information which is picked up at these test points by the scanning means. This pattern is interpreted according to a five-unit code shown in Table II below:

TABLE II

| Character | Test Points | | | | |
|---|---|---|---|---|---|
| | A | B | C | D | E |
| 1 | 0 | X | X | 0 | 0 |
| 2 | X | 0 | X | X | 0 |
| 3 | X | X | X | 0 | 0 |
| 4 | ---- | X | 0 | X | 0 |
| 5 | 0 | X | X | 0 | X |
| 6 | 0 | X | X | X | X |
| 7 | 0 | X | 0 | 0 | 0 |
| 8 | X | X | X | X | X |
| 9 | X | 0 | X | 0 | X |
| 0 | X | 0 | X | X | X |

NOTE.—0 indicates white; X indicates black.

Table II is intended to be illustrative only, and need not be followed exactly if practical operating conditions dictate otherwise. For instance, it is assumed that with the particular group of characters under consideration, all five test points may be utilized to identify each character, except in the case of the digit "4." In the case of the digit "4" the test point A is located very close to the border between black and white areas; hence the information from point A cannot be relied upon due to the permissible tolerances in the printing of the character. However, it is possible to disregard the unreliable information from point A and still identify this particular character. If a different group of characters is being considered (that is, for example, a group of characters having a different style of printing), it may be found desirable to omit or disregard information in a manner which differs from that indicated in Table II. The present invention is adapted to meet situations of various kinds in actual practice and is not limited to the precise mode of operation herein described.

The code illustrated in Table II is only one of several that may be employed. It is within the purview of the invention to analyze alphabetic characters and other symbols as well as numerical characters, and to utilize any number and arrangement of test points as may be required to identfy each character that may be read by the machine. Furthermore, in general, the scan may be in any direction and need not be constant in velocity or direction. The coordinate system may be "tied" or referred to any boundary of the character and may have any practical required spacing of coordinate lines. Finally, the coordinate system used need not be referred or "tied" to a boundary of the character, but may indeed be referred to but a single point on the character; for example, the point at which the scanning spot first enters the character in the first scan or in any other scan. In this case the counting would be continuous rather than intermittent, and the limits of the coordinate system would be defined by the scan line through said point and any arbitrary terminating line, together with any other convenient limits or reference lines that may be adopted.

The machine is so constructed and arranged that it will examine the spot or elemental area illuminated by the scanning ray whenever the scanning process reaches a phase denoted by one of the test points A to E, Table I. After observing these preselected spots within the scanning area, the machine remembers which are black and which are white, and in accordance with the code set forth in Table II, it recognizes the identity of the character which has just been scanned. This information may be used in any desired manner; for instance, to control the punching of a record card. If the stored black and white information does not correspond to any of the codes set forth in Table II, the machine can be adapted to give an indication thereof, if this is desired. Special provisions (described subsequently) are employed for handling hyphens and the like.

GENERAL DESCRIPTION—FIRST EMBODIMENT

Fig. 5 is a simplified block diagram of a character recognition device which embodies certain principles of this invention. In this diagram the photocell 30 (see also Fig. 7E) corresponds to the photocell 30 shown in Fig. 1. Fig. 5 shows only the electrical signal elements exclusive of power supplies or optical and scanning elements, which are tacitly assumed. The signals of the photocell 30 are generated, shaped and amplitude-controlled in the input unit 42. The video output of the input unit is an enhanced replica of the output signal from the photocell 30, in that noise present in the photocell output signal is removed and the rise time of the various signal pulses is improved. The resultant output comprises a train of essentially rectangular pulses, which are of variable spacing and variable duration. Actually there are two outputs, one in phase with the input and the other in phase opposition thereto. One of these outputs is used to control the recognition gates 50, and the other is applied to a control unit 44, as will be explained in detail presently.

Initially, the entire system is in the reset condition and when the first scanning spot encounters the starting edge of the character, a negative pulse is supplied from the output side of the input unit 42 to the control unit 44. This negative pulse causes a constant-frequency oscillator in the control unit 44 (disclosed in detail hereinafter) to start oscillating at such a frequency that 64 oscillations occur during the time required to scan the full height of a character. These oscillations from the control unit 44, after being appropriately shaped into discrete counting pulses, are applied to the input side of a counter 45, which in the present embodiment comprises an eleven-stage binary counter. Initially each stage of the counter 45 is in the binary "0" condition. The sixth stage of the binary counter 45 assumes its binary "0" state when 64 counting pulses (or any multiple thereof) have been registered, and this causes a pulse to be applied to the control unit 44, which thereupon acts to turn off the oscillator in the control unit 44. Thus, the control unit 44 is automatically controlled so that it will emit a series of 64 counting pulses each time it is operated, The aforesaid process is repeated each time a scanning spot sweeps across the field or area in which the character is located. That is to say, each time a scanning spot encounters the starting edge 38 of the character, Fig. 4, in the course of a line scan, the photocell 30 generates a pulse of such character that the control unit 44 is set in operation. This causes a series of 64 counting pulses to enter the binary counter 45. The 64th or final pulse in the series causes the sixth stage of the binary counter 45 to be switched to its binary "0" condition, and this in turn generates a type of reset pulse for stopping the oscillations generated by the control unit 44. The counter 45 has a total capacity of 2,047 counts, which is ample to accommodate the five test points illustrated in Table I above. When all five test points have been read, and the character has been identified (in the manner presently described), the counter 45 is automatically reset so that all stages thereof are restored to their "0" condition.

Figure 6:
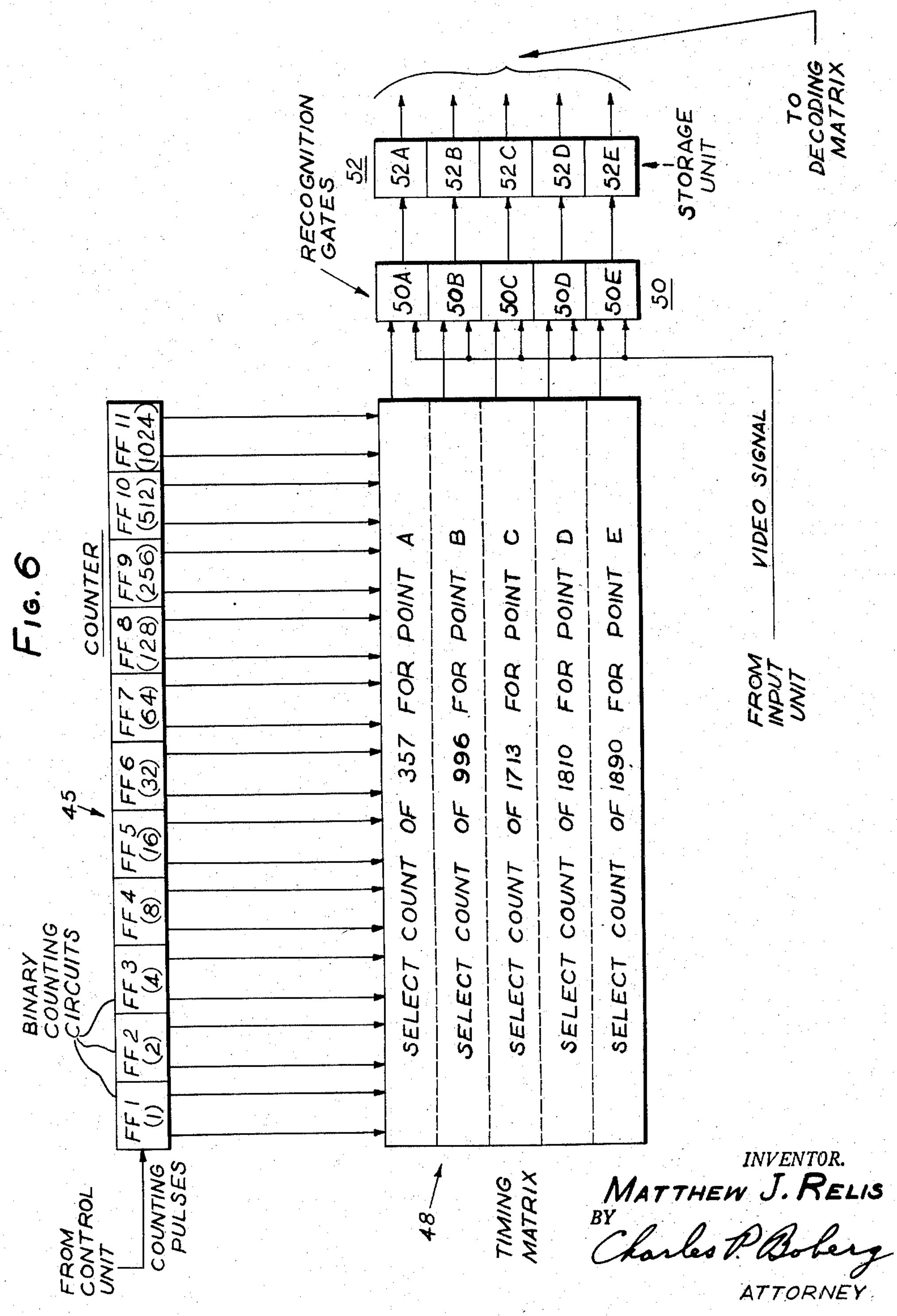
Fig. 6 is a more detailed block diagram showing a portion of the system represented in Fig. 5.

The apparatus includes means for "sampling" the video signal from the input unit 42 whenever the total count registered by the counter 45 arrives at certain predetermined values. As has been mentioned, the counter 45 maintains a cumulative or progressive count of all the pulses generated by the control unit 44 while a particular character is being scanned. Referring now to Fig. 6, in conjunction with Fig. 5, the timing matrix 48 associated with the counter 45 automatically conditions the apparatus to sample the portions of the video signal which correspond to the test points. That is to say, the video signal is sampled at the respective instants when the count maintained by the counter 45 reaches those values corresponding to the test points as set forth in Table I.

As will be described in greater detail presently, the timing matrix 48 comprises a network of resistors (or alternative diodes) arranged in five groups respectively corresponding to the five test points A to E. The binary counter 45 comprises eleven flip-flop stages, FF1 to FF11, inclusive. Each flip-flop has a pair of conductors connected to the timing matrix 48, one of these conductors being the more positive when the flip-flop is in its binary "0" state, and the other conductor being the more positive when the flip-flop is in its binary "1" state. As the counting pulses from the control unit 44 enter the counter 45, the flip-flops are caused to alternate between their "0" and "1" conditions in the well-known manner, according to the binary code, for representing the number of pulses counted. The pattern of voltages on the eleven pairs of output conductors from the eleven stages of the counter 45 represents the total pulse count.

The timing matrix 48 responds to certain predetermined voltage patterns on the aforesaid output conductors to condition certain recognition gates 50 in a selective manner for sampling the video signal. For example, when the count registered in the binary counter 45 reaches the binary equivalent of 357, a recognition gate 50A, Fig. 6, is conditioned momentarily to pass a "black" video signal, if one is available at that time. Assuming that the video signal at this instant is "black," the gate 50A will conduct momentarily (since all of its grids are then positive), thereby developing a negative output pulse. On the other hand, if the video signal at that instant is "white," the gate 50A does not conduct; consequently, no output pulse is produced. The presence or absence of a negative output pulse from a recognition gate at the appropriate time indicates whether the spot illuminated by the scanning beam at that instant is black or white, respectively. Referring to Table I, the recognition gate 50A is conditioned to sample the video signal when the count reaches 357 (test point A); the recognition gate 50B is conditioned to sample the video signal when the count reaches 996 (test point B); and so on for the remaining test points C, D and E.

To recapitulate, the timing matrix 48 functions to condition the recognition gates 50A to 50E, Fig. 6, for sampling the video signal at certain predetermined times which occur respectively when the counter 45 registers the five selected counts, as indicated in Fig. 6 and in Table I above. If the video signal happens to be black at one of these selected instants, a negative output pulse is produced by the corresponding recognition gate, and if the video signal is white, this output pulse is absent.

The output of each recognition gate 50, Figs. 5 and 6, acts upon one of the storage elements in the storage unit 52. Each of these storage elements, as will be described subsequently, comprises a flip-flop which changes from an initial "0" state to a binary "1" state in response to a negative input pulse. Thus, if the video signal is black at the instant when a particular gate such as 50A samples the video signal, this gate thereupon supplies a negative pulse to the corresponding storage element such as 52A, causing the storage element to store a binary "1." If the video signal is white at this time, the storage element remains in its binary "0" state. After all of the test points have been scanned, the identity of the character will be indicated by the resective "0" and "1" states of the storage elements 52A to 52E, Fig. 6, in accordance with Table II. For instance, if the storage elements 52B and 52C are storing binary "1's," while the other storage elements are storing "0's," this indicates that the numeral "1" has been scanned.

Referring again to Fig. 5, the various elements of the storage unit 52 are connected to a decoding matrix 54, the construction of which is similar to that of the timing matrix 48. The decoding matrix 54 has five pairs of input leads, one pair connected to each storage element, so that the matrix responds to the code representation of the character stored in the storage unit. The decoding matrix 54 has a series of output leads connected to an output unit 56, which records or manifests the character that has been recognized. In the present embodiment the output unit 56 contains a group of ten thyratrons, one for each of the ten numeric characters. Depending upon the pattern of output voltages furnished by the decoding matrix 54, one of these thyratrons will be fired to operate a recording element controlled thereby for recording a representation of the identified character. It will be understood, of course, that output units of other types may be employed in place of the one disclosed herein without departing from the principles of the invention.

As will be explained in detail subsequently, an actuator unit 58, Fig. 5, prevents any of the aforesaid thyratrons in the output unit 56 from being operated until the last of the storage elements (52E) has been set. After the selected thyratron and its associated recording element have been operated, certain control functions take place to reset the storage elements 52 and the thyratrons in the output unit 56 to their initial states independently of the reset unit 46. The reset unit 46 functions to reset various bistable elements in the counter 45 and the input circuit 42, thereby placing the system in readiness for identifying the next character, and under some conditions it may also reset the storage flip-flops.

As shown in Fig. 1, the serial numbers which are read by the machine may contain hyphens. These hyphens are of such short duration that the oscillator in the control unit 44, Fig. 5, is not operated a sufficient number of times to register a count in the counter 45 corresponding to the final test point. Therefore, the resetting of the storage elements which usually occurs when the final test point is scanned fails to take place in the case of a hyphen. Because of this contingency, the reset unit 46 is arranged so that it automatically supplies a reset pulse to the storage unit 52 as a matter of course, which reset pulse becomes effective in the event that the storage elements have not already been reset in the usual fashion as described above.

The control unit 44 is automatically reset after the

64th counting pulse in each train of counting pulses has been generated by the oscillator. For this reason, a reset pulse from the reset unit 46 is not required in the case of the control unit 44.

DETAILED DESCRIPTION—FIRST EMBODIMENT

The circuit diagram Figs. 7A to 7M illustrates the details of the various circuits that are shown schematically in the block diagram of Fig. 5. Fig. 8, on the same sheet as Fig. 7K, indicates the manner in which Figs. 7A to 7M should be joined.

The photocell 30, Fig. 7E, is of the electron multiplier type and includes a cathode 60, a series of dynodes 61 and an anode 62. Light energy impinging upon the cathode 60 causes a flow of electron current to the first dynode 61, which generates a secondary emission current exceeding the primary current from the cathode 60. This secondary emission current impinges upon the second dynode 61, causing an even larger secondary current to be emitted from the latter. This effect is cascaded by the remaining diodes in a similar fashion to produce a multiplied electron flow to the anode 62. The output voltage of the photocell 30 is developed by this electron flow through the anode resistor 65.

Input unit 42, Figs. 5, 7E and 7F, controls the amplitude of the signal developed by the photocell 30, eliminates noise from this signal, eliminates the transition pulse V1 (Fig. 3) after the same has been utilized, squares the waveform and raises the level of the signal to a value sufficient for driving the other circuits. Referring to Fig. 7E, the output voltage developed across the anode resistor 65 of the photocell 30 is applied to a vacuum tube 66, operated as a cathode follower, which is located close to the photocell 30. By virtue of its low output impedance, this cathode follower can be connected to the remainder of the system through a cable of considerable length without introducing undesirable capacitive loading. The vacuum tube 66 feeds the diode rectifier section 68A of a tube 68. This rectifier section 68A has its cathode connected to the slider of a potentiometer 69 in the cathode circuit of the tube 66. The anode of the diode rectifier section 68A is connected through the resistors 71 and 72 to the slider of a potentiometer 70 in the anode supply circuit. The diode rectifier 68A develops at its plate a voltage equal approximately to the lowest excursion of the photocell anode voltage, this being the negative-going transition pulse V1, Fig. 3. It will be recalled that this pulse is produced during the brief interval when two scanning spots such as 31 and 32, Fig. 2, are simultaneously present within the scanning field. In order for the diode rectifier 68 to function in this manner, the sliders of the potentiometers 69 and 70 are adjusted to produce the proper negative differential so that diode 68A does not conduct except during the lowest excursion of the photocell anode voltage.

A portion of the rectified voltage furnished by the diode rectifier 68A is applied through a voltage divider comprising the resistors 71 and 72 to the control grid of a pentode vacuum tube regulator 74. The tube 74 is connected in parallel with a series of neon diodes 76, and this parallel combination is connected in series with the voltage divider network which supplies the photocell dynode and anode voltages, across the high voltage supply. The effect of this connection is to hold the peak-to-peak amplitude of the photocell output voltage at a substantially constant value, regardless of photocell supply voltage variations, light source fluctuations, changes in the reflectance of the white portions of the paper on which the characters are printed, and so on. The regulatory action is brought about whenever there is a variation in the amplitude of the negative transition pulse V1, Fig. 3. If, for example, this negative pulse increases its amplitude due to one of the possible causes enumerated above, the control grid of the tube 74 will be driven more negative, causing the voltage drop from anode to cathode of tube 74 to increase, and thereby decreasing the voltage across the photocell dynode and anode supply voltage divider. This decrease in voltage causes the photocell sensitivity to decrease in such a way as to keep the photocell peak-to-peak output voltage at a constant value. The discharge time constant determined by resistors 71 and 72 and capacitor 78, Fig. 7E, is chosen to provide the proper speed for this regulatory action, this time constant being long compared with the period of a single vertical scan. Neon diodes 76 serve to protect vacuum tube 74 from having excessive anode voltage applied thereto in the event of an abnormally large signal, by limiting said voltage to a value equal to or less than the combined starting voltages of said diodes.

The output from vacuum tube 66 is also applied to the cathode of the diode section 68B, which serves as a clipper. The anode voltage of section 68B is adjusted by means of a potentiometer to such a value that the transition pulse, which has served its purpose for regulation of the signal amplitude, is now clipped off. The clipped signal, which contains only those components that indicate whether black or white is being scanned, is applied to the cathode follower connected section 80A of a vacuum tube 80. Associated with the tube 80 is a low-pass filter generally designated 81, Figs. 7E and 7F. The filter 81 cuts off at a frequency whose period is twice the rise time of the photocell output signals, which rise time is approximately the time required to scan the width of the scanning spot. The filter 81 removes photocell shot and thermal noise without substantially affecting the signal. The effective output impedance of the cathode follower connected section 80A matches the low impedance of the filter 81. The output of section 80A, after passing through the filter 81, is returned to the amplifier section 80B of the vacuum tube 80 by way of a differentiating circuit comprising a capacitor 82 and resistor 83. The differentiated signal is amplified by section 80B and by the section 84A of a twin-triode vacuum tube 84.

The output of the amplifier section 84A is applied to a noise suppressor consisting of a twin-diode vacuum tube 85 and its associated circuitry, which suppresses all baseline noise below a predetermined level by the use of biased diodes, one for each polarity of noise. The output of the noise suppressor is amplified by the section 84B and is applied to vacuum tube 88 connected as a flip-flop, which changes to one of its stable states when a positive-going pulse is applied thereto, and reverts to the other of its stable states when a negative-going pulse is applied. Vacuum tube 88 serves to regenerate the original waveform by shortening the rise and decay times to produce a square wave output.

The output from one plate of the flip-flop 88 is fed to the control unit 44, Figs. 7A and 7B, for a purpose which will be explained presently. The output from the other plate is applied to a vacuum tube 90 connected as a cathode follower, Fig. 7F, whose cathode output drives the reset unit 46, Figs. 7A and 7B, and the second grids of the vacuum gate tubes 50, Figs. 7D and 7J, in accordance with the video signal. The gate tube second grids just mentioned are driven positive when black is being scanned and are returned to zero potential when white is being scanned. After each character is scanned, the vacuum tube 88, Fig. 7F, is reset to its white condition (if it is not already in that condition) by a pulse from the reset unit 46.

The output signal from the vacuum tube 88 which goes to the control unit 44, Figs. 7A and 7B, is differentiated by the capacitor 92 and resistor 93, Fig. 7A. This differentiated signal takes the form of a short negative pulse each time the scanning spot enters a black area of the scanning field, which occurs simultaneously with the leading edge of each black signal pulse V3, Fig. 3. As will be explained presently, only the first of these black signal pulses has any effect upon the control unit 44 during each vertical scan.

Referring again to Fig. 7A, the first negative pulse from the differentiator 92—93 is applied through the diode 94 to vacuum tube 95 connected as a flip-flop, which thereupon changes its state in response to this pulse. As the vacuum tube 95 changes state, it causes the vacuum tube 96 to be cut off (tube 96 normally being in a conducting state). As tube 96 is cut off, oscillations are initiated in a tuned circuit 99 by the interruption of the current supplied thereto by tube 96. The oscillations will continue so long as vacuum tube 95 remains in this new state, and they will be of substantially constant amplitude during this period by virtue of positive feedback to the tuned circuit 99 from a vacuum tube 98 connected as a cathode follower. This positive feedback is adjusted so that the effective decrement of the tuned circuit 99 is substantially zero.

The vacuum tube 95 is not affected by any further negative pulses (nor by positive pulses either) which may come by way of the differentiator 92—93 and the diode 94, until after the vacuum tube 95 has been reset by a negative pulse via diode 104 as described presently. That is to say, once the scanning spot has encountered a black portion of the character for the first time during a single vertical scan, it will cause the vacuum tube 95, Fig. 7A, to assume its second stable state and remain in that condition for a predetermined length of time irrespective of any fluctuation between the white and black levels of the video signal during the remainder of that vertical scan. Thus, the oscillator consisting of the vacuum tube 98 and the tuned circuit 99 is triggered into action when the scanning spot enters the character proper for the first time in any line scanning period, and it continues to oscillate for a predetermined interval within the remainder of that period. This action occurs during each vertical scan in which any portion of the character is being scanned.

The oscillations furnished by the oscillator 98—99 are taken from the cathode of the tube 98 and are applied to the first grid of a vacuum tube 100, Fig. 7A, which serves as an amplifier, limiter and gate for the signals from the oscillator. The output of the tube 100 is applied to the grid of a tube 102, wherein further amplification and limiting takes place. The output of tube 102 comprises a series of discrete counting pulses, one for each oscillation of the oscillator 98—99.

These counting pulses are applied to the binary counter 45, Figs. 7B, 7C and 7D, the operation of which will be described presently. When 64 successive counting pulses have been registered in the counter 45, a negative pulse is fed back to the cathode of a diode 104, Fig. 7A, in the control unit 44. This negative pulse is transmitted through the diode 104 to vacuum tube 95, switching the latter back to its initial state. The means for generating this negative back pulse is disclosed in the subsequent description of the counter.

The vacuum tube 95, in reverting to its initial state, causes the tube 96 to conduct again, thereby rapidly damping out the oscillations in the tuned circuit 99 of the oscillator. To prevent any trailing oscillations from registering extra, unwanted counts in the counter 45, the negative-going pulse generated at the left hand plate of the vacuum tube 95, Fig. 7A (when it resumes its initial state), is differentiated and applied to the third grid of the tube 100. This cuts off the tube 100 long enough to prevent the aforesaid trailing oscillations, which occur after the 64th oscillation, from being transmitted to the counter unit 45.

The circuitry associated with the tube 100, Fig. 7A, is designed for use with a type 6BN6 tube, which is a triple-grid gated beam tube with sharp-cutoff first and third grids (called limiter and quadrature grids, respectively), and an accelerating second grid. This tube 100 has the characteristic that its anode current can be cut off by driving either grid No. 1 or grid No. 3 to cutoff, or grid No. 2 to zero, and can, therefore, serve as a gate tube. This tube has the property that when the plate current thereof is reduced to zero, by cutting off the first or third grid, the accelerator grid current increases by almost the same amount. The sum of plate and accelerator grid currents is, therefore, nearly constant, and this explains the screen connection shown for tube 100.

The counter 45, Figs. 7B, 7C and 7D, comprises a chain of flip-flops FF1 to FF11, inclusive, which are arranged in the form of a binary counting circuit. This eleven-stage counter will register a maximum of 2047 counts. The counting pulses coming from the control unit 44 are negative-going, substantially rectangular pulses, and they are applied through a differentiating circuit comprising the capacitor 108 and resistor 109 to the first flip-flop FF1 of the counter 45. Each of the differentiated negative pulses is applied simultaneously to the grids in both sides of the flip-flop FF1. The negative pulse cuts off the side of the flip-flop which is conducting, without immediately affecting the other side which is already cut off. The well-known cumulative action which then results causes the side of the flip-flop that formerly was not conducting to become conductive.

Larger positive pulses are required to trigger a flip-flop of this type than negative pulses. The signal level and design parameters are properly chosen so that only the negative differentiated pulses will cause a flip-flop to switch. Hence, each time a negative input pulse reaches the flip-flop FF1 it changes the state thereof, so that FF1 is switched back and forth between the binary "0" and binary "1" conditions in response to the negative counting pulses from the control unit 44.

When the flip-flop FF1 is switched from the binary "1" state back to the initial binary "0" state in response to the second counting pulse, it applies a negative pulse to the second flip-flop FF2, switching FF2 to the binary "1" condition. FF2 remains in this state until the next time FF1 is switched from the "1" state to the "0" state, whereupon FF2 reverts to the "0" state and causes FF3 to store a binary "1." By this time there will have been four counting pulses delivered to the counter 45. The counting progresses in this fashion through the succeeding stages of the binary counter 45. Each higher stage will remain in whatever condition it is set until the next lower state switches from the "1" condition to the "0" condition, in the well known manner.

It was explained hereinabove that each time the scanning spot scans one line of the character field, 64 counts are registered in the counter 45. When the scanning has progressed to the test point A, Fig. 4, the total count registered in the counter 45 will be 357 (Table I). According to the principles of binary notation, the binary quantity registered at this time in the counter 45 (with the least significant digit written first and the higher significant digits in ascending order ) is 10100110100. The respective states of the flip-flops FF1 to FF11 at the instant corresponding to each of the test points are indicated in Table III below.

Thus, when the scanning spot reaches test point A, the counter 45 will be in such a condition that each of the stages FF1, FF3, FF6, FF7 and FF9 thereof is storing a binary "1," while the remaining stages are storing "0." In similar fashion the condition of the counter 45 when the scanning has progressed to each of the other test points B, C, D and E is likewise indicated by Table III.

The sixth stage FF6 of the binary counter 45 is switched back to the "0" state each time the progressive count reaches 64, or a multiple thereof (128, 192, and so on). In other words, the final pulse in each group of 64 counting pulses delivered to the counter 45 causes the stage FF6 to switch from "1" to "0." Whenever this occurs, a negative pulse is fed back from stage FF6 through a diode 104, Fig. 7A, to the vacuum tube 95, thereby resetting

TABLE III

| Test Point | FF1 | FF2 | FF3 | FF4 | FF5 | FF6 | FF7 | FF8 | FF9 | FF10 | FF11 | Decimal Count |
|---|---|---|---|---|---|---|---|---|---|---|---|---|
| A | 1 | 0 | 1 | 0 | 0 | 1 | 1 | 0 | 1 | 0 | 0 | 357 |
| B | 0 | 0 | 1 | 0 | 0 | 1 | 1 | 1 | 1 | 1 | 0 | 996 |
| C | 1 | 0 | 0 | 0 | 1 | 1 | 0 | 1 | 0 | 1 | 1 | 1,713 |
| D | 0 | 1 | 0 | 0 | 1 | 0 | 0 | 0 | 1 | 1 | 1 | 1,810 |
| E | 0 | 1 | 0 | 0 | 0 | 1 | 1 | 0 | 1 | 1 | 1 | 1,890 |

NOTE.—1 indicates binary "1" state; 0 indicates binary "0" state.

the flip-flop of which this tube is a part and terminating the chain of counting pulses for that particular line scanning period. Thus, the counter 45 is operated intermittently by groups of 64 counting pulses each, there being one such group of pulses generated during each "line scanning" period (that is, during the time interval in which each vertical scan takes place).

When any of the counter stages such as FF1, Fig. 7B, is storing a "1," the left-hand output lead 110 thereof is positive with respect to the right-hand output lead 111. Each of the counter stages has a similar pair of output leads, of which the left-hand one of the pair is the more positive when the corresponding stage is in its "1" condition, and the right-hand lead of the pair is the more positive one when the stage is in its "0" condition.

The timing matrix 48, Figs. 7B, 7C, 7D, 7G, 7H and 7J, comprises a network of resistors arranged in five groups of eleven resistors each. Each resistor group corresponds to one of the test points A to E and is associated with a corresponding one of the recognition gate tubes 50A to 50E, Figs. 7D and 7J. Each of these recognition gates has a pair of grids, such as the grids 115 and 116 in the case of the gate 50A, which are connected respectively to a pair of the matrix output leads such as 117 and 118. These leads are connected by the matrix resistors to the output leads such as 110 and 111, Fig. 7B, from the various counter stages. The interconnections among these various counter output leads and matrix output leads are such that whenever the setting of the counter 45 attains a value corresponding to one of the test points A to E, Table I, the two matrix output leads going to a particular one of the recognition gates 50 are rendered positive simultaneously, thereby conditioning this particular gate to transmit a black signal if one is available at that time.

In the case of the recognition gate 50A, for example, the matrix output leads 117 and 118 are connected by certain matrix resistors to the left-hand output leads of the counter stages FF1, FF3, FF6, FF7 and FF9, and by other matrix resistors to the right-hand output leads of the counter stages FF2, FF4, FF5, FF8, FF10 and FF11. At the instant when the total count reaches 357, corresponding to the test point A, all of the counter output leads which are connected to the matrix output leads 117 and 118 will be the more positive ones, thus raising the potentials of leads 117 and 118 to a given positive level. Appropriate resistors to the negative supply voltage bus keep the matrix output leads such as 117 and 118 at voltages below the cutoff value for grids 115 and 116 of gate 50A except when these leads are driven to their most positive extent at the instant when the corresponding test point is being scanned.

The same analysis may be repeated in the case of the other test points. That is to say, when the total count reaches a value corresponding to a given test point, the first and third grids of the corresponding recognition gate are pulsed positively to condition the tube for passing a black signal if one is available at that time. Two grids, rather than one, are utilized for this purpose in order to obtain the optimum gating reliability.

Although the timing matrix 48 has been illustrated as being made up of resistors, it is apparent that the same results could be achieved, perhaps more readily, by the use of crystal diodes or equivalent circuit elements.

Each of the gate tubes such as 50A, Fig. 7D, has an accelerator grid such as 120 which is connected to the cathode output terminal of the cathode follower 90, Fig. 7F, in the input unit 42. As has been mentioned above, the cathode follower 90 drives the connected gate tube accelerator grids positive when a black signal is sensed. Thus, if the character field is black in the vicinity of the test point A, the three grids of the recognition gate 50A, Fig. 7D, are rendered simultaneously positive when the counter 45 reaches a total count of 357. This causes a negative pulse to be generated at the plate of the gate tube 50A. If, on the other hand, the test point A happens to be white, the accelerator grid of the gate tube 50A is not driven positive when the time for "looking" at test point A arrives. Under these conditions the gate tube 50A does not generate a negative output pulse.

Each of the other gate tubes 50B to 50E is controlled in a similar manner, that is to say, it is conditioned to pass a black signal when the counter 45 attains a count corresponding to the test point in question. If the video signal is black at this time, the recognition gate produces a negative output pulse; otherwise it does not.

Figure 7L:
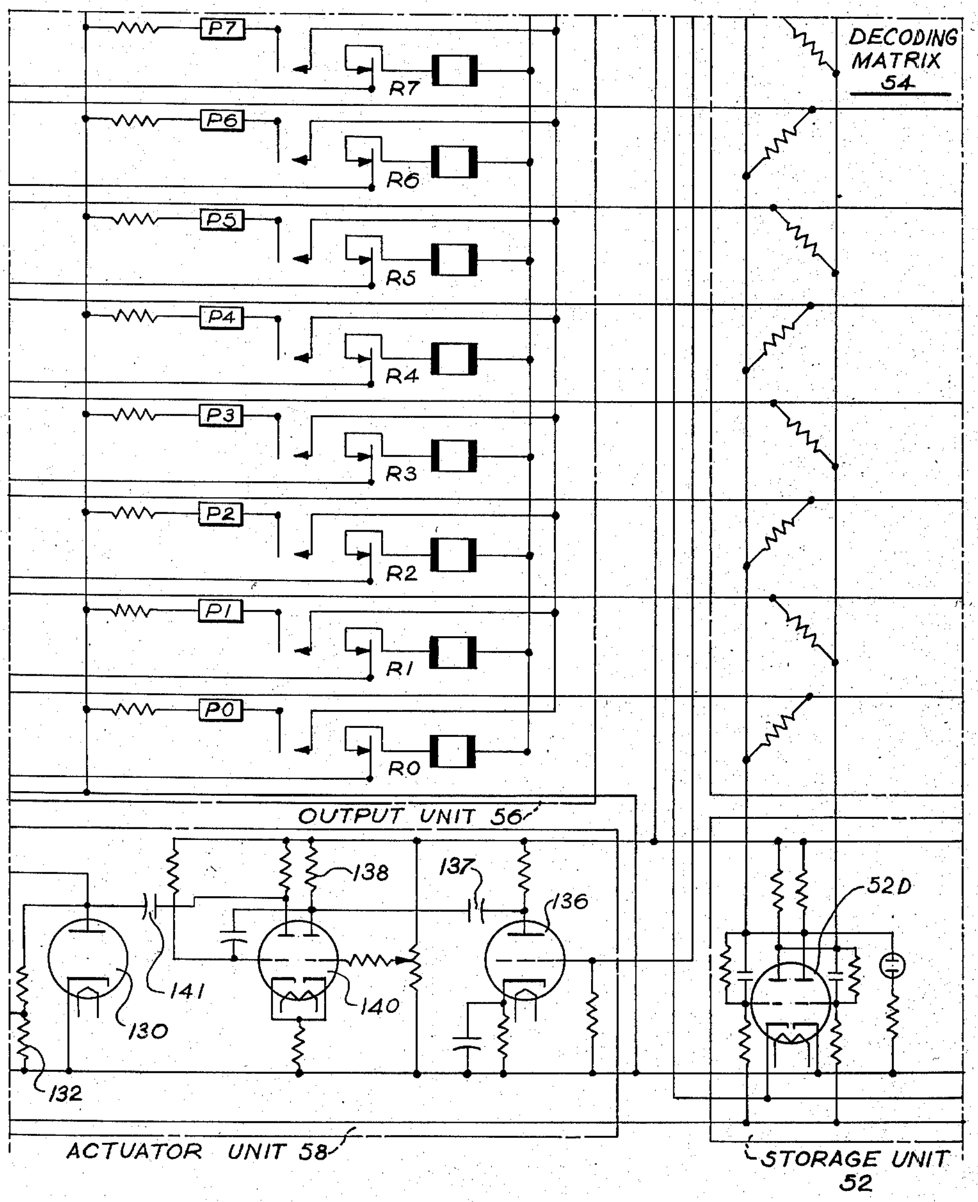
Figure 7M:
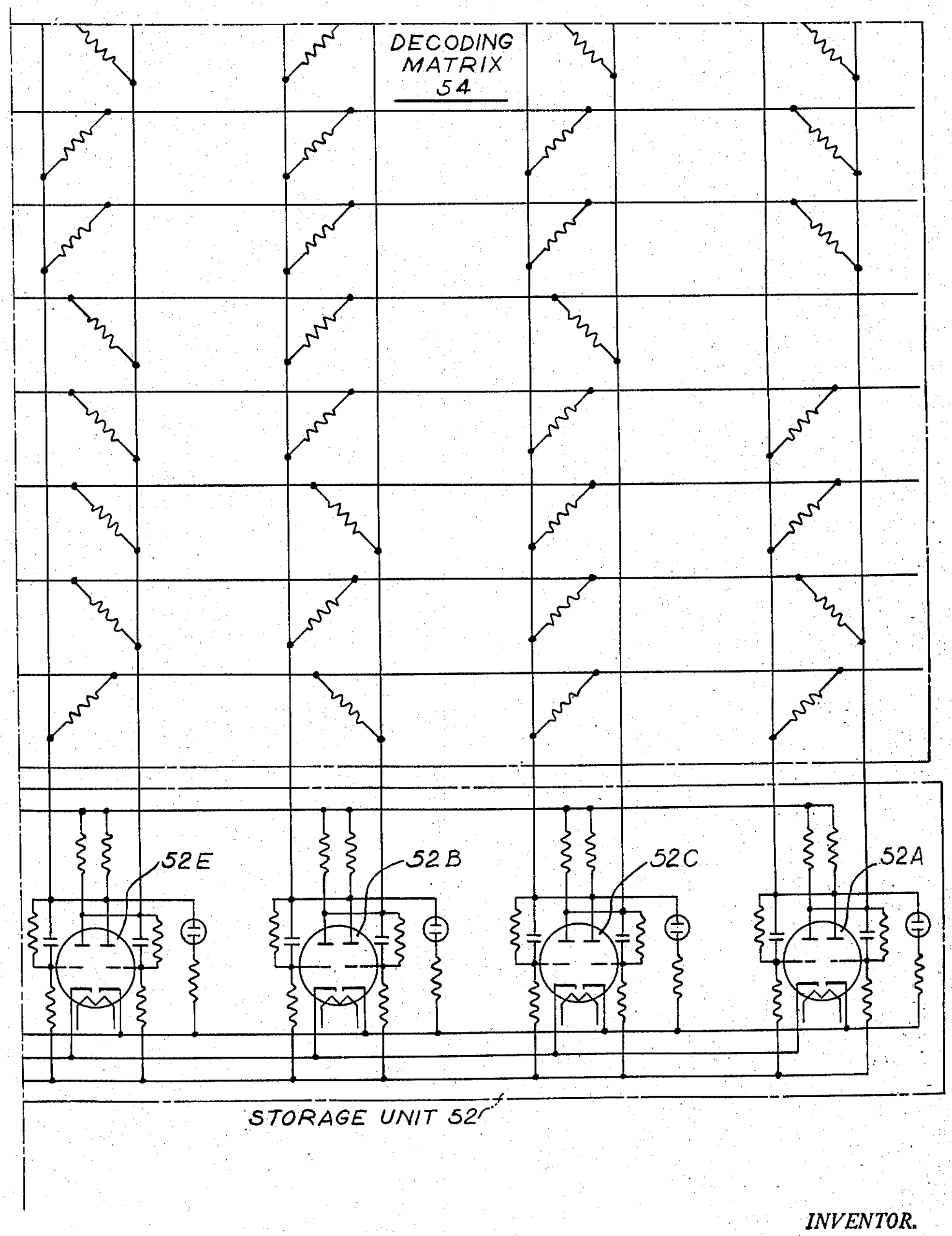

The storage unit 52, Figs. 7L and 7M, comprises the five vacuum tubes 52A, 52B, 52C, 52D and 52E connected as flip-flops for storage purposes. When a negative pulse is generated at a plate of a recognition gate tube 50A, 50B, 50C, 50D or 50E, Figs. 7D and 7J, indicating a black video signal, this negative pulse is applied to the corresponding vacuum tube 52A, 52B, 52C, 52D or 52E, causing the same to switch from the initial "0" state to the "1" state. Once a storage flip-flop is set in this manner, it remains in that condition until reset by operation of either the output unit 56 or the reset unit 46, as will be explained. If the video signal is white at a time when a particular recognition gate is conditioned for operation, there will not be a negative pulse to the corresponding storage flip-flop, and this flip-flop, therefore, remains in the "0" state. Thus, the settings of the storage vacuum tubes 52A to 52E represent the manner in which the various recognition gates 50A to 50E have been operated; which is to say, the storage flip-flops will register the pattern of light and dark test points existing in the field of the character.

The decoding matrix 54, Figs. 7H, 7J, 7L and 7M, functions on the same general principle as the timing matrix 48 described above. These are five pairs of input leads to the decoding matrix coming respectively from the vacuum tubes 52A to 52E, and there are ten output lines going from the decoding matrix 54 to the output unit 56. In other words, there is one pair of input leads for each of the five test points, and an output line for each of the ten characters to be recognized. For each of ten combinations of "1" and "0" inputs to the decoding matrix (according to which of the test points are black and white, respectively) there will be a positive output voltage on one of the ten output lines, with the remainder of the output lines being negative at this time.

The output unit 56, Figs. 7G, 7H, 7K and 7L includes a set of ten thyratrons T0 to T9, inclusive. The control grids of these ten thyratrons are connected respectively to the ten output leads from the decoding matrix 54. The shield grids of these ten thyratrons are connected in multiple to the plate of a diode 130 in the actuator unit 58, Fig. 7L. These shield grids normally are held negative due to the voltage division between resistors 131 and 132, Figs. 7K and 7L. Hence, although a selected output lead from the decoding matrix may have a positive voltage on it, the control grid of the corresponding thyratron will not be sufficiently positive to fire the thyratron until such time as the shield grid thereof is driven to a more positive level.

This behavior with regard to shield grid voltage occurs because each thyratron has control grid and shield grid control characteristics that resemble the grid control characteristics of a gate tube, in that if both grids are held a few volts negative so that the thyratron is not firing, a few volts increment in either electrode potential will cause the thyratron to fire, but if one of the grids is driven a few volts more negative, a much larger increment in the voltage of the other grid must be effected to cause the thyratron to fire.

The vacuum tube 135, Fig. 7J, is associated with those output leads of the timing matrix 48 which correspond to the final test point E. That is to say, the first and third grids of this tube 135, are connected in parallel with the first and third grids of the gate tube 50E. The second grid of the tube 135 is held at a constant positive potential with respect to its cathode. The tube 135 is a Type 6BN6 tube and has substantially the same sort of circuit connections associated therewith as does the vacuum tube 100, Fig. 7A. At the instant when the final test point E is scanned, the various grids of the tube 135, Fig. 7J, are simultaneously positive, causing a negative voltage pulse to appear at the plate. This pulse is is amplified and inverted by the tube 136, Fig. 7L, in the actuator unit 58, and is thereafter differentiated by the capacitor 137 and resistor 138. The slightly delayed negative portion of the differentiated pulse triggers a tube 140, connected as a monostable multivibrator, which thereupon switches from its initial state to a second quasi-stable state and then automatically returns to its initial state after a predetermined time delay. Upon switching to the quasi-stable state, the multivibrator 140 develops a positive pulse of predetermined direction which is applied through a capacitor 141 to the plate of the diode 130 and the shield grids of the thyratrons T0 to T9, Fig. 7K, in the output unit 56. Diode 130 serves as a clipper to prevent the shield grids of the thyratrons from being driven above ground potential by the positive pulse generated by the tube 140, which otherwise might cause a thyratron to fire in the absence of a positive voltage on the control grid thereof.

The function of the tube 136 and the differentiator 137—138 is to delay the firing of any thyratrons in the output unit 56 until the output of the decoding matrix 54 has become stable following the scanning of the last ten points in a character field. After this delay, the actuator unit 58 pulses all of the thyratron shield grids from their normal negative potential to zero potential. At this time, assuming that a character has been scanned, there will be only one thyratron in which the control grid is positive, the control grids of the other thyratrons being negative. This one thyratron, therefore, will be fired.

Associated with the thyratrons T0 to T9 are relays R0 to R9, respectively. Each of these relays has a normally closed contact, and the anode voltage for its thyratron is supplied through the winding of this relay and its normally closed contact. When anode current starts to flow, the relay energizes and closes a normally open contact thereof, thereby closing circuit to an operative element such a magnet in a tabulating card punch. These punch magnets are respectively designated P0 to P9, Fig. 7L. It will be understood, of course, that these magnets can be replaced by, or used in conjunction with, neon lamps or other indicating or recording elements if so desired.

From the foregoing it will be seen that by firing one of the thyratrons T0 to T9, a corresponding one of the elements P0 to P9 is caused to operate for recording or manifesting the character which has been identified. This action is only momentary, for when any of the relays R0 to R9 energizes, it opens its normally closed contact and thereby deprives the associated thyratron of anode supply voltage. This extinguishes the thyratron prior to to the deenergization of its relay. Hence, the relay is operated momentarily, and by the time the normally closed relay contacts reclose, the thyratron shield grids will have returned to the negative bias voltage, and no thyratron can be fired again until the next character is read.

Anode current is supplied to the various thyratrons T0 to 79 through a resistor 145, Fig. 7L. When any of the thyratrons is fired, a negative voltage pulse is developed across this resistor 145 for resetting all of the storage flip-flops 52A to 52E, Figs. 7L to 7M. This pulse serves to prevent any flip-flop 52 from being triggered by a noise pulse from the thyratron. Hence, whenever a character has been scanned, the storage flip-flops are reset automatically upon operation of the selected punch element or equivalent device identifying the character. The action which takes place when a hyphen rather than a character has been scanned, will be described presently.

The reset unit 46, Figs. 7A and 7B, has an amplifier vacuum tube 150 whose grid is coupled to the cathode output of vacuum tube 90, Fig. 7F, in the input unit 42. Said output comprises positive pulses corresponding to the black areas of the character which are sensed by the scanning spot during the successive line scans, and intermediate zero-level pulses corresponding to the white areas. The tube 150 normally is biased to cutoff but it becomes conductive and discharges capacitor 152 in response to each black pulse in the video signal. Each time the black signal pulse is terminated, as the scanning spot enters a white area, the tube 150 ceases to conduct, and the plate voltage thereof commences to rise exponentially due to the charging of capacitor 152 through resistor 151. Each time a black pulse is initiated, the tube 150 begins to conduct, the rise is interrupted and the capacitor is discharged. The rate at which the plate voltage rises is determined by the time constant of the resistor 151 and capacitor 152, as well as the anode supply voltage.

The plate voltage of tube 150 is differentiated by the capacitor 153 and is applied to the control grid of a thyratron 155. The magnitude of the positive-going portion of this voltage increases with the length of the interval between black video pulses. The circuit values are so chosen that it is only during the "dead" period between characters that the signal applied to the thyratron 155 has sufficient amplitude to fire this thyratron. That is to say, the reset unit 46 automatically operates after a predetermined time interval following termination of the scan of the last black point in a given character. This is true regardless of whether a character or hyphen has been scanned. The interval is such that it permits operation of the reset unit 46 before the scanning spot enters the next character field.

When the thyratron 155, Fig. 7B, fires, it applies reset voltages respectively to the vacuum tube 88 (Fig. 7F) in the input unit 42, to the various stages FF1 to FF11 of the counter 45 (Figs. 7B, 7C and 7D), and to the vacuum tubes 52A to 52E (Figs. 7L and 7M) in the storage unit 52, thereby resetting all of these elements, provided they have not already been reset as in the case of the storage flip-flops after a character has been scanned. (If a hyphen had been scanned, the storage flip-flops then would be reset by the reset unit 46). When the vacuum tube 88, Fig. 7F, is reset, it remains in its white signal condition until the next character is scanned. The counter 45 is cleared and restored to its zero condition when the reset pulse is applied thereto. Thus the system is placed in readiness for the next character.

TRANSFORMED CHARACTER IMAGES

If the non-rectangular coordinate system shown in Fig. 4 were to be transformed into a rectangular coordinate system so that the zero axis 38 of all the ordinates would fall along a predetermined straight line, perpendicular to the vertical scan, the character "0" then would be transformed from the shape thereof shown in Fig. 9A into the shape thereof shown in Fig. 9B. The curved starting edge 38 (Figs. 4 and 9A) of the original character now becomes the straight reference edge 38A (Fig. 9B) of the transformed character. The positions of the original test points A to E, Fig. 9A, are altered as shown in Fig. 9B as a result of the transformation.

The coordinate system for each of the various characters may be transformed into a rectangular system to produce a transformed image of the character. In some instances it may happen that the "transformed" character actually is identical with the original character. For example, the digit "1," Fig. 9C, has a starting edge 38 which already is a straight line; therefore it coincides with the starting edge 38A, Fig. 9D, of this character after its transformation. In effect, then, no transformation has really taken place. The same is true of the digit "2," Figs. 9E and 9F. In the case of the other digits, however (Figs. 9G to 9V), a transformation of the character is required in order that all of the ordinates will be referred to a zero or reference axis which is a straight line. In the case of the digit "7," Fig. 9Q, the original starting edge (as defined hereinabove) is discontinuous, but it becomes a continuous straight line in the transformation, Fig. 9R.

It should be borne in mind that what has been stated above about specific characters may be true of those characters when printed in one type style and not necessarily true of the same characters printed in another type style. In general, the only character which will not undergo a transformation of its shape is one in which the lower edge is a straight line extending entirely across the field or space occupied by that character, perpendicular to the vertical scan.

The most significant thing about the transformation method illustrated in Figs. 9A to 9V is that no matter how much the relative positions of the test points A to E may vary among the original characters, they will be identical for all characters following the transformation thereof. Thus, in figures such as Figs. 9B, 9D, 9F and so on, the test points A to E form identical geometric patterns for all transformed characters even though these test points did not form identical patterns as among the original characters. This identity of test patterns in the transformed characters results from a fundamental principle of the invention, namely, that the coordinates of each test point as measured from the so-called starting edge of each character will be identical for all characters.

In the first embodiment of the invention described above, a transformation of each character takes place in a figurative sense by virtue of the manner in which the distributor (counter 45 and its associated timing circuitry) is caused to function. In the second embodiment of the invention which is about to be described, a transformed character image actually is utilized in the distribution process.

SECOND EMBODIMENT

It is proposed in this form of the invention to utilize a cathode ray tube having triggered sweep circuits for the purpose of forming a character image which is stabilized against any inaccuracies in the positioning of the original character. A cathode ray tube display of this type is disclosed and claimed in the copending application of J. W. Bozeman, Serial No. 396,247, filed December 4, 1953. The vertical sweep circuit of the aforesaid cathode ray tube is triggered so that each line of the vertical sweep commences exactly at the instant when the scanning spot encounters the starting edge of the character. The horizontal sweep circuit is triggered to commence at the instant when the scanning spot first encounters the character in the first effective vertical scan. The image of the character is transformed by this method so that the starting edge of the character invariably coincides with a given straight line having a fixed position on the screen of the cathode ray tube, and the starting point for all characters will be the same fixed point on said screen.

Referring now to Fig. 10, which schematically illustrates the essential portions of this second embodiment, video signals are provided by an input unit 160 that corresponds to the input unit 42 shown in Fig. 5. The first time that a black signal voltage appears at the output side of the unit 160, for each character scanned, the horizontal sweep generator 162 of the cathode ray tube 163 commences to generate its horizontal deflecting voltage, which continues to build up linearly for a period equal to the horizontal scanning time per character and then returns to its initial value after the character has been scanned. The vertical sweep generator is triggered once for each vertical scan of the scanning spot on the document, the vertical sweep in each instance being initiated the first time a black signal appears at the output of the input unit 160 during the current vertical scan. The vertical deflecting voltage builds up linearly in each of said vertical scans until the end of that scan, at which time the sweep generator is restored in preparation for the next line.

As thus far described, the apparatus shown in Fig. 10 corresponds substantially to that disclosed in the aforesaid Bozeman application. The present apparatus, however, is distinguished from the Bozeman device in that it uses but a single cathode-ray tube, functioning as a distributor, to selectively activate certain sensitive elements which determine the patterns of light and dark spots at the respective test points in the characters. The sensitive elements may be electrodes mounted on the screen of the cathode ray tube, sensitive to the current in the cathode ray tube beam; they may be photosensitive elements placed directly in front of the screen and sensitive to the light emitted by the screen; or they may be any other form of elements appropriately sensitive to the cathode ray tube beam or to the radiation generated thereby. In any event, the elements are positioned to correspond with the geometric arrangement of test points in the transformed character images. It is essential that any effects which persist from a previous character be of negligible magnitude so that there will be no interference with the reading of a new character.

In the case where visible radiation from the cathode ray tube screen is utilized, a stationary mask 166 positioned before the screen of the cathode ray tube 163 has five "test holes" therein at positions respectively corresponding to the positions of the test points A to E in the transformed character image which is being projected upon the screen. Behind the mask 166 is a group of sensitive elements comprising the recognition photocells generally designated 168, Fig. 10, there being one of these photocells sensitive to light passing through each of the test holes in the mask 166. These photocells 168 respectively control a corresponding group of flip-flops or other pulse storage devices in the storage unit 170, which corresponds to the storage unit 52 in Fig. 5.

From this point on, the operation of the apparatus shown in Fig. 10 is substantially the same as that of the apparatus shown in Fig. 5. The settings of the storage elements 170 are interpreted by the decoding matrix 172 to identify the character scanned, and an output unit 173 is operated accordingly. An actuator unit 174 controlled by the horizontal sweep generator 162 conditions the output unit 173 so that it does not operate until the last of the test points has been scanned. As an incident to operation of the unit 173, the storage unit 170 is reset. Inasmuch as this embodiment does not employ a counter, there is no need for a separate reset unit.

SUMMARY

From the foregoing description it can be seen that the present invention effects a substantial advance in the art of reading or recognizing legible characters. Not only does it enable conventionally shaped characters to be recognized, but it also compensates automatically for inaccuracies in the positioning of such characters. By distributing the "test points" over the whole field of the character, rather than confining all of them to a single line as has been done in some instances heretofore, complete freedom in the shaping of the characters is permitted. It will be appreciated, of course, that while the invention facilitates the recognition of conventionally shaped characters, it can be adapted also to identify unconventional characters or symbols, if desired. The word "character," therefore, should be construed broadly herein.

The use of a distributor which is triggered intermittently in progressive phases of its operation by a successive-line scanner (that is to say, being triggered each time the scanning spot encounters a given reference edge of the same character), and which activates storage elements selectively in a given sequence according to the black or white information sensed respectively at the instants when the distributor attains certain preselected phases in a plurality of line scans, is believed to be new in this art. In effect, this distributor establishes a coordinate system and a set of test points for each character having the following properties:

(*a*) Each test point will have a predetermined ordinate as measured from a given starting edge of the character, and a predetermined abscissa as measured from one extremity of that edge, these ordinates and abscissas in general being different among the various test points for a given character.

(*b*) The coordinates of each test point will be the same for all of the characters that may be recognized, notwithstanding any variations in the positions of such characters with respect to their nominal positions.

There may be situations in which the number of test points utilized will differ from that disclosed hereinabove. For instance, one may desire to use the apparatus for recognizing only a particular character or a limited number of characters, and under these circumstances it may be feasible to use a smaller number of test points than would be needed to recognize all of the characters in a given group. Furthermore, although the characters illustrated herein have starting edges of uniform length, this is not a necessary condition for utilization of the invention. The apparatus can be adapted to recognize some characters having short starting edges by using a more limited number of test points in the case of those characters.

While the intermittent triggering of a distributor in synchronism with the intermittent detection of a starting edge is an imporant feature of the invention as disclosed herein, it is possible also to devise a system in which the distributor is triggered only once per character, that is, when the starting point is detected. The counting or integration in this instance would be a continuous process. Another equivalent way in which the distributor might be caused to function would be to initiate a measured delay following detection of the starting point, then actually trigger the distributor into operation after the conclusion of this delay period at the instant when the starting edge is detected. This would eliminate a large number of unused cycles of the control unit.

Hence, while there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In a device for recognizing one or more characters recorded upon a medium, the combination of scanning means including a source of light flux and means adapted to utilize the same during a sequence of line scanning periods for scanning said medium successively along a plurality of lines thereon in the neighborhood of each character, distributor means adapted to be operated intermittently through a progression of phases in response to intermittent control signals, input means controlled by said scanning means for generating input signals that represent the variations in the light flux from said medium as it is scanned along said lines in succession, said input means also including provisions for supplying to said distributor means a control signal for initiating operation thereof each time a predetermined edge portion of said character is detected by said scanning means during its successive line scans, said distributor means being capable of operating progressively for a predetermined time within a respective one of said line scanning periods in response to each of said control signals, storage means comprising a plurality of individually settable storage elements, and means enabling said storage means to be controlled in part by said input means and in part by said distributor means for setting said storage elements individually in a predetermined sequence according to the respective intensities of the light flux from those points on said medium which are scanned at the respective instants when said distributor means attains certain preselected phases of its operation during a selected plurality of line scanning periods after the first of said control signals is received.

2. In a device for recognizing one or more characters recorded upon a medium, the combination of scanning means for scanning said medium successively along a plurality of lines thereon in the neighborhood of each character to detect the portions of said lines which are covered by said character, with each line being scanned during an individual line scanning period, input means controlled by said scanning means for generating control signals of a predetermined significance corresponding to the respective portions of said lines which are covered by said character, distributor means controlled by said input means adapted to operate progressively for a predetermined time within a respective one of said line scanning periods in response to the first significant control signal generated during each line scan, and storage means operable under the control of said input means and said distributor means including a plurality of individually settable storage elements adapted to be set respectively in accordance with the presence or absence of significant control signals from said input means at the respective instants when said distributor means attains certain preselected phases of its operation during a selected plurality of line scanning periods after the first of said control signals is received.

3. In a device for recognizing one or more characters recorded upon a medium, the combination of scanning means for scanning said medium successively along a plurality of lines thereon in the neighborhood of each character to detect the portions of said lines which are covered by said character, said lines being scanned respectively during a sequence of individual line scanning periods, input means controlled by said scanning means for generating control signals of a predetermined significance corresponding to the respective portions of said scan lines which are covered by said character, distributor means controlled by said input means adapted to perform one progressive part of its complete operation in response to the first significant control signal in each line of the scan and being unresponsive to succeeding control signals in the same line, and storage means operable under the control of said input means and said distributor means including a plurality of individually settable storage elements adapted to be set respectively in accordance with the presence or absence of significant control signals from said input means at the respective instants when said distributor means attains certain preselected phases of its operation occurring respectively during a selected plurality of line scanning periods after the first of said control signals is received.

4. In a device for recognizing one or more characters recorded upon a medium, the combination of scanning means for scanning said medium successively along a plurality of lines in the neighborhood of each character, said lines being scanned respectively during a sequence of individual line scanning periods, input means controlled by said scanning means for generating control signals of a predetermined significance corresponding to the respective portions of said lines which are covered by said character, distributor means controlled by said input means adapted to operate progressively between predetermined phases of a line scanning period in response to the first significant control signal generated during each line scan, and storage means operable under the control of said input means and said distributor means including a plurality of individually settable storage elements adapted to be set respectively in accordance with the presence or absence of significant control signals from said input means at predetermined instants throughout a selected plurality of line scanning periods after the first of said control signals is received.

5. In a device for recognizing one or more characters recorded upon a medium, the combination of scanning means for scanning said medium successively along a plurality of lines thereon in the neighborhood of each character, said lines being scanned respectively during a sequence of individual line scanning periods input means controlled by said scanning means for generating control signals of a predetermined significance corresponding to the respective portions of said lines which are covered by said character, distributor means controlled by said input means adapted to perform one progressive part of its complete operation in response to the first significant control signal in each line scan and being unresponsive to succeeding control signals in the same line scan, and storage means operable under the control of said input means and said distributor means including a plurality of individually settable storage elements adapted to be set respectively in accordance with the presence or absence of significant control signals from said input means at predetermnied instants during the scanning of a plurality of lines when said distributor means attains certain preselected phases of its operation during a selected plurality of line scanning periods occurring after the first of said control signals is received.

6. In an apparatus for recognizing one or more characters recorded upon a medium, the combination of illuminating means for causing a plurality of light beams to scan across said medium successively in a given direction in a sequence of individual line scanning periods, means for producing relative movement between said medium and said illuminating means in a direction transverse to said given direction, light-sensitive means for producing video signals that vary according to the variations in the intensity of the light coming from said medium as each light beam scans across said medium in the neighborhood of a character recorded thereon, distributor means intermittently operable through a progression of phases, control means responsive to the video signals from said light-sensitive means to initiate operation of said distributor means when said illuminating means first illuminates any portion of said character and being effective thereafter to reinitiate the operation of said distributor means whenever said character is first illuminated by each succeeding light beam, settable storage elements controlled jointly by said distributor means and said light-sensitive means for respectively storing indications of the relative light intensities at selected points in said area as said distributor means attains certain preselected phases of its operation which occur respectively during a selected plurality of line scanning periods after the operation of said distributor means is first initiated, and means for identifying the character which has been scanned in accordance with the relative settings of said storage elements.

7. In an apparatus for recognizing one or more characters recorded upon a medium, the combination of illuminating means for causing a plurality of light beams to scan across said medium successively in a given direction during a selected plurality of individual line scanning periods, means for producing relative movement between said medium and said illuminating means in a direction transverse to said given direction, light-sensitive means for producing video signals that vary according to the variations in the intensity of the light coming from said medium as each light beam scans across said medium in the neighborhood of a character recorded thereon, intermittently operable distributor means, control means responsive to the video signals from said light-sensitive means to initiate operation of said distributor means when said illuminating means first illuminates any portion of said character and being effective thereafter to reinitiate the operation of said distributor means whenever said character is first illuminated by each succeeding light beam, said distributor means and said control means being so arranged that said distributor means operates for a predetermined time once its operation has been initiated, settable storage elements controlled jointly by said distributor means and said light-sensitive means for respectively storing indications of the relative light intensities at selected points in said area as said distributor means attains certain preselected phases of its operation which occur respectively during a selected plurality of line scanning periods after the operation of said distributor means is first initiated, and means for identifying the character which has been scanned in accordance with the relative settings of said storage elements.

8. In an apparatus for recognizing one or more characters recorded within a given area on a record medium, the combination of illuminating means for causing a plurality of light beams to scan across said medium successively in a given direction during a selected plurality of individual line scanning periods, said illuminating means being so arranged that the scanning spot projected upon said medium by each of said light beams enters one side of said area shortly before the scanning spot projected upon said medium by the preceding light beam leaves said area at the opposite side thereof, light-sensitive means responsive to light coming from said medium to produce video signals in accordance with the variations of light intensity, said light-sensitive means including gain control means responsive to the peak video signals generated during the respective instants when two scanning spots are simultaneously present within said area to maintain the peak video signals at a substantially constant amplitude, distributor means operating in timed relation with the scanning of each character by said illuminating means, settable storage devices jointly controlled by said distributor means and said light-sensitive means for respectively storing indications of the relative light intensities at selected points in the area occupied by each character as said distributor means attains certain preselected phases of its operation respectively occurring in a selected plurality of line scanning periods after the character is first illuminated by a scanning spot, and means for identifying the character which has been scanned in accordance with the relative settings of said storage elements.

9. In an apparatus for recognizing one or more characters recorded upon a medium, scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of the input signal exceeding a predetermined level, a pulse generator operable to generate counting pulses in a timed sequence, control means responsive to the input signal generated by said input means for initiating operation of said pulse generator when the intensity of said input signal first exceeds said predetermined level in the course of each line scan, an intermittently operable pulse counter responsive to the counting pulses generated by said pulse generator for maintaining a cumulative count thereof, means controlled by said counter for interrupting the operation of said pulse generator each time a given number of counting pulses has been generated during each line scan, a plurality of storage elements individually settable in various permutations to store representations of various characters, and selecting means controlled jointly by said counter and said input means for setting said storage elements respectively in accordance with the intensity of said input signal at the respective instants when the cumulative count registered by said counter attains certain predetermined values occurring in a selected plurality of line scanning periods.

10. In an apparatus for recognizing one or more characters recorded upon a medium, scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of the input signal exceeding a predetermined level, a pulse generator operable to generate counting pulses in a timed sequence, control means for initiating operation of said pulse generator when the intensity of said input signal first exceeds said predetermined level in the course of each line scan and for terminating the operation of said pulse generator after a measured interval within the line scanning period, an intermittently operable pulse counter responsive to the counting pulses generated by said pulse generator for maintaining a cumulative count thereof, a plurality of storage elements individually settable in various permutations to store representations of various characters, and selecting means controlled jointly by said counter and said input means for setting said storage elements respectively in accordance with the intensity of said input signal at the respective instants when the cumulative count registered by said counter attains certain predetermined values occurring in a selected plurality of line scanning periods.

11. In an apparatus for recognizing one or more characters recorded upon a medium, scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of said signal exceeding a predetermined level, a pulse generator operable to generate pulses in a timed sequence, an intermittently operable pulse counter adapted to maintain a cumulative count of pulses delivered thereto, operating means for said counter controlled by said input means for enabling a predetermined number of pulses from said pulse generator to enter said counter when the intensity of said input signal first exceeds said predetermined level in each of the line scanning periods, a plurality of storage elements individually settable in various permutations to store representations of various characters, and selective setting means controlled jointly by said counter and said input means for setting said storage elements respectively in accordance with the intensity of said input signal at the respective instants when the cumulative count registered by said counter attains certain predetermined values occurring in a selected plurality of line scanning periods.

12. In an apparatus for recognizing one or more characters recorded upon a medium, scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of said signal which exceeds a predetermined level, a pulse source capable of being gated on and off, control means responsive to the input signal generated by said input means for gating said pulse source on when the intensity of said signal first exceeds said predetermined level in each line scanning period, a pulse counter responsive to said pulse source and including a plurality of counting stages adapted to maintain a cumulative count of pulses furnished by said source, means controlled by said counter and effective each time a predetermined one of said stages is operated to gate said pulse source off, a plurality of storage elements individually settable in various permutations to store representations of various characters, and selecting means controlled jointly by said counter and said input means for setting said storage elements respectively in accordance with the intensity of said input signal at the respective instants when the cumulative count registered by said counter attains certain predetermined values occurring in a selected plurality of line scanning periods.

13. An apparatus for recognizing one or more characters recorded upon a medium, said apparatus comprising scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of said signal exceeding a predetermined level, an intermittently operable pulse counter adapted to maintain a cumulative count of pulses supplied thereto, pulsing means for said counter controlled by said input means for supplying a predetermined number of pulses to said counter when the intensity of said input signal first exceeds said predetermined level in each of the line scanning periods, a plurality of storage elements individually settable in various permutations to store representations of various characters, and selective setting means controlled jointly by said counter and said input means for setting said storage elements respectively in accordance with the intensity of said input signal at the respective instants when the cumulative count registered by said counter attains certain predetermined values occurring in a selected plurality of line scanning periods.

14. In combination with an apparatus as claimed in claim 13, decoding means for identifying the character represented by the settings of said storage elements, and means under control of said decoding means for manifesting the character thus identified.

15. In combination with an apparatus as claimed in claim 13, reset means controlled by said input means for resetting said storage elements when said input means fails to attain said predetermined intensity within a given time interval.

16. In combination with an apparatus as claimed in claim 13, reset means controlled by said input means for resetting said counter when said input means fails to attain said predetermined intensity within a given time interval.

17. An apparatus for recognizing one or more characters recorded upon a medium, said apparatus comprising scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by said character being represented by an intensity of said signal exceeding a predetermined level, an intermittently operable pulse counter adapted to maintain a cumulative count of pulses supplied thereto, pulsing means for said counter controlled by said input means for supplying a predetermined number of pulses to said counter when the intensity of said input signal first exceeds said predetermined level in each of the line scanning periods, a plurality of signal storage elements individually settable in various permutations to store signals representing various characters, and a plurality of gating devices controlled by said counter and respectively effective at the instants when the cumulative count registered by said counter attains certain predetermined values occurring in a selected plurality of line scanning periods to condition said storage elements in sequence for selective setting under the control of said input signal.

18. In combination with an apparatus as claimed in claim 15, recording means under the control of said storage elements adapted to record a character represented by the respective settings thereof, and actuator means effective when the last of said storage elements is set to actuate said recording means.

19. In an apparatus for recognizing one or more characters recorded upon a medium, scanning means for scanning said medium line by line in the neighborhood of each character during a sequence of line scanning periods, input means controlled by said scanning means for generating an input signal which represents the information picked up by said scanning means in each line of its scan, with the portion or portions of each line occupied by the character being represented by an intensity of said signal exceeding a predetermined level, a pulse source responsive to the input signal generated by said input means for supplying a predetermined number of pulses when the intensity of said signal first exceeds said predetermined level in each line scanning period, a pulse counter responsive to said pulse source and including a plurality of counting stages settable to maintain a cumulative count of the pulses supplied by said source, a plurality of gating devices, a plurality of storage elements respectively controlled by said gating devices and individually settable in various permutations to store representations of various characters, and a timing matrix responsive to the settings of said binary counting stages for sequentially enabling said gating devices at the respective instants when said counter registers certain predetermined counts in a selected plurality of line scanning periods, each of said gating devices being effective when enabled to transmit said input signal to its respective storage element for setting said element in accordance with the intensity of said signal.

20. Apparatus for identifying one or more characters recorded upon a medium, said apparatus comprising scanning means for scanning said medium line by line in the neighborhood of each character, input means controlled by said scanning means for generating an input signal the intensity of which exceeds a predetermined level whenever the portion or portions of each line occupied by said character are being scanned, a cathode ray tube having vertical and horizontal deflecting means and a screen upon which an image is projected in response to the operation of said input means and said deflecting means, a vertical sweep generator for said vertical deflecting means controlled by said input means to commence each virtual sweep cycle when the intensity of said input signal first exceeds said predetermined level in the course of each line scan, recognition means including a plurality of light-sensitive cells arranged to respond respectively to the illumination from predetermined points on said screen, a plurality of settable storage elements respectively controlled by said cells and adapted to be set in sequence according to the respective intensities of the illumination from said points on said screen, and means for interpreting the settings of said storage elements to identify the character which has been scanned.

21. Apparatus as claimed in claim 20, further comprising a horizontal sweep generator for said horizontal deflecting means controlled by said input means to commence the horizontal sweep cycle when the intensity of said input signal first exceeds said predetermined level during the scanning of said area.

22. In an apparatus for recognizing one or more characters recorded upon a medium, the combination of scanning means for scanning said medium successively along a plurality of lines in the neighborhood of each character to develop video information therefrom, said lines being scanned respectively during a sequence of line scanning periods, distributor means, input means responsive to said scanning means for generating a predetermined signal when said scanning means encounters a transition from a portion of said medium not occupied by said character to an adjoining portion of said medium which is occupied by said character in each line scanning period, control means operatively associated with said input means for initiating operation of said distributor means in response to one of said predetermined signals, said distributor means being adapted to operate in progressive fashion during the succeeding line scanning periods, sampling means controlled by said distributor means for sampling the video information developed by said scanning means as said distributor means attains certain preselected phases of its operation in a plurality of selected line scanning periods following receipt of said one predetermined signal, and information storage means responsive to said sampling means for storing the sampled information.

23. An apparatus for recognizing one or more characters recorded upon a medium, said apparatus comprising scanning means for scanning said area line by line in the neighborhood of each character during a sequence of line scanning periods, input means controlled by said scanning means for generating a video signal which represents the information picked up by said scanning means in each line of its scan, with the portion or portions of each line occupied by said character being represented by an intensity of said video signal exceeding a predetermined level, distributor means operable through a progression of phases, control means responsive to the video signal from said input means for initiating operation of said distributor means when the intensity of said video signal first exceeds said predetermined level, said distributor means being adapted to operate progressively during the succeeding line scanning periods, gate means controlled by said distributor means for sampling said video signal a plurality of times when said distributor means attains certain preselected phases of its operation in a plurality of line scanning periods, and analyzing means under the control of said gate means for determining the identity of said character from the relative intensities of the sampled portions of the video signal.

References Cited in the file of this patent

UNITED STATES PATENTS

| | | |
|---|---|---|
| 2,209,106 | Brand | July 23, 1940 |
| 2,265,445 | Paris | Dec. 9, 1941 |
| 2,285,296 | Maul | June 2, 1942 |
| 2,351,231 | Ridings | June 13, 1944 |
| 2,375,044 | Skellett | May 1, 1945 |
| 2,533,242 | Gridley | Dec. 12, 1950 |
| 2,616,983 | Zworykin | Nov. 4, 1952 |
| 2,635,195 | Hancock | Apr. 14, 1953 |
| 2,682,043 | Fitch | June 22, 1954 |
| 2,838,602 | Sprick | June 10, 1958 |